(12) United States Patent
Sato et al.

(10) Patent No.: US 8,481,197 B2
(45) Date of Patent: Jul. 9, 2013

(54) BIPOLAR SECONDARY BATTERY, METHOD FOR MANUFACTURING THE BIPOLAR SECONDARY BATTERY, BIPOLAR ELECTRODE, METHOD FOR MANUFACTURING THE BIPOLAR ELECTRODE AND ASSEMBLED BATTERY

(75) Inventors: Masanobu Sato, Yokosuka (JP); Kenji Hosaka, Yokosuka (JP); Hideaki Horie, Yokosuka (JP); Yoshio Shimoida, Yokosuka (JP); Masanori Aoyagi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 353 days.

(21) Appl. No.: 12/988,603

(22) PCT Filed: Sep. 25, 2009

(86) PCT No.: PCT/IB2009/006952
§ 371 (c)(1),
(2), (4) Date: Oct. 19, 2010

(87) PCT Pub. No.: WO2010/035120
PCT Pub. Date: Apr. 1, 2010

(65) Prior Publication Data
US 2011/0039146 A1 Feb. 17, 2011

(30) Foreign Application Priority Data
Sep. 26, 2008 (JP) ................................ 2008-247721
Jun. 3, 2009 (JP) ................................ 2009-133934

(51) Int. Cl.
*H01M 6/46* (2006.01)
*H01M 4/82* (2006.01)
*H01M 10/18* (2006.01)

(52) U.S. Cl.
USPC .......................... 429/152; 429/210; 29/623.1

(58) Field of Classification Search
USPC ................................. 429/152, 210; 29/623.1
See application file for complete search history.

(56) References Cited

U.S. PATENT DOCUMENTS

| 4,331,745 | A | 5/1982 | Catanzarite |
| 4,352,867 | A | 10/1982 | Catanzarite |
| 4,385,101 | A | 5/1983 | Catanzarite |
| 2008/0220330 | A1 | 9/2008 | Hasaka et al. |

FOREIGN PATENT DOCUMENTS

| CN | 1728441 A | | 2/2006 |
| JP | 1-194273 A | | 8/1989 |
| JP | 11-204136 | | 7/1999 |
| JP | 2006-139994 A | | 6/2006 |
| JP | 2006-156000 A | | 6/2006 |
| JP | 2006156000 A | * | 6/2006 |
| JP | 2008-097940 A | | 4/2008 |

* cited by examiner

*Primary Examiner* — Karie O'Neill Apicella
(74) *Attorney, Agent, or Firm* — Young Basile

(57) ABSTRACT

A bipolar secondary battery includes a plurality of bipolar electrodes, each including a current collector that has a positive electrode layer on one surface thereof and a negative electrode layer on the opposite surface thereof. A separator is disposed between adjacent two bipolar electrodes such that the positive electrode layer of one bipolar electrode and the negative electrode layer of the adjacent bipolar electrode adjacent are opposed to each other along the length of the separator. The positive electrode layer and the negative electrode layer are formed with protrudent portions disposed at positions offset from each other along a length of the current collector.

21 Claims, 15 Drawing Sheets

ABOUT 2mm or MORE

40~200μm
5~40μm

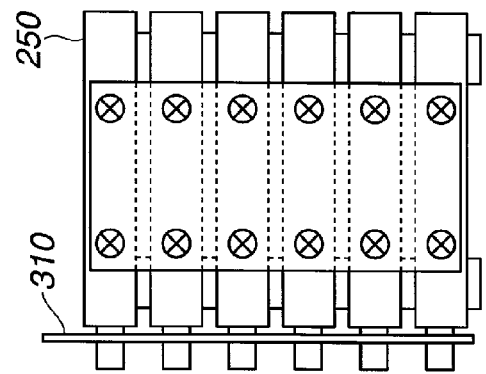
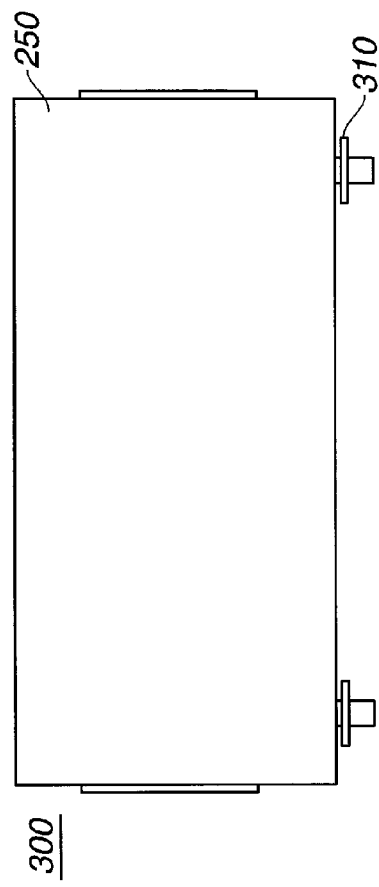
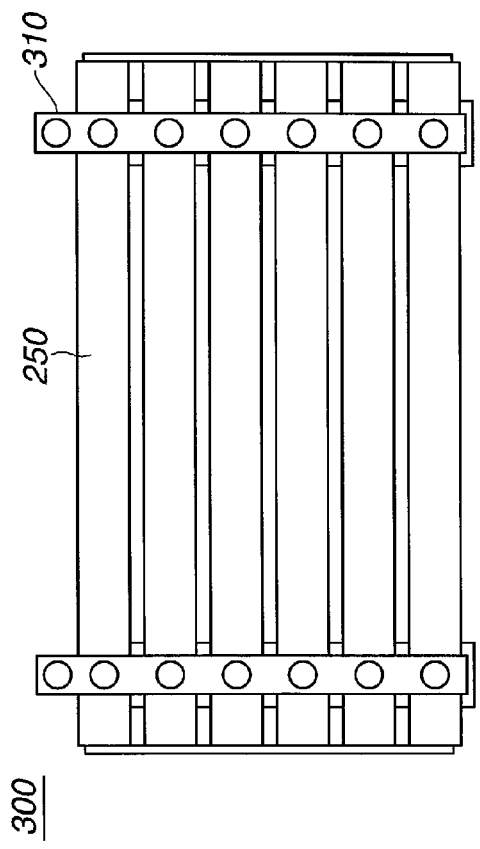

US 8,481,197 B2

BIPOLAR SECONDARY BATTERY, METHOD FOR MANUFACTURING THE BIPOLAR SECONDARY BATTERY, BIPOLAR ELECTRODE, METHOD FOR MANUFACTURING THE BIPOLAR ELECTRODE AND ASSEMBLED BATTERY

CROSS-REFERENCE TO RELATED APPLICATIONS

The present application claims priority from Japanese Patent Application No. 2008-247721, filed Sep. 26, 2008 and Japanese Patent Application No. 2009-133934, filed Jun. 3, 2009, the contents of which are both hereby incorporated by reference in their entirety.

TECHNICAL FIELD

The present invention relates to a bipolar secondary battery, a method for manufacturing the bipolar secondary battery, a bipolar electrode, a method for manufacturing the bipolar electrode and an assembled battery.

BACKGROUND

A double-pole secondary battery (also called a bipolar secondary battery) includes a plurality of bipolar electrodes that each include a current collector, a positive electrode disposed on one surface of a current collector and a negative electrode disposed on an opposite surface of the current collector. In such a structure of the bipolar electrodes, the plurality of bipolar electrodes are stacked on each other such that the positive electrode and the negative electrode are opposed to each other along a separator including an electrolyte layer (refer to Japanese Patent Application Laid-Open No. 11-204136). Thus, in the bipolar secondary battery, one battery cell (a unit cell) is constituted of the positive electrode, the negative electrode and the separator (the electrolyte layer), which are disposed between the current collectors.

BRIEF SUMMARY

Japanese Patent Application Laid-Open No. 11-204136 discloses that both the positive electrode and the negative electrode are formed by applying respective active materials for the positive and negative electrodes to the surfaces of the current collectors. In a case where the electrodes are formed by such an application of the active materials, the electrodes have a raised portion (a protrudent portion) at end portions thereof, respectively If the raised portions of the respective electrodes are located in alignment with each other along the separator between the electrodes, a local area of the separator will undergo a strong force due to the presence of the raised portions. The local area of the separator tends to be excessively reduced in thickness or penetrated, thereby causing a short circuit between the positive electrode and the negative electrode.

Embodiments of the present invention provide a bipolar secondary battery capable of preventing an internal short circuit in each unit cell thereof.

One example of a bipolar secondary battery according to the present invention includes a bipolar electrode having a first electrode layer formed on a first surface of a current collector and a second electrode layer formed on a second surface of the current collector. Further, a plurality of the bipolar electrodes are stacked such that the first electrode layer and the second electrode layer are opposed to each other along a separator disposed between the first electrode layer and the second electrode layer. A protrudent portion disposed on an end portion of the first electrode layer is located at a position different from a position of a protrudent portion that is disposed on an end portion of the second electrode layer.

With this arrangement, the protrudent portions that are disposed at the end portions of each of the first electrode layer and the second electrode layer are prevented from being opposed in alignment with each other along the separator disposed between the first and second electrode layers. Accordingly, it is possible to suppress occurrence of a short circuit inside each unit cell in the bipolar secondary battery.

Details and variations of these embodiments and others are described hereinafter.

BRIEF DESCRIPTION OF THE DRAWINGS

The description herein makes reference to the accompanying drawings wherein like reference numerals refer to like parts throughout the several views, and wherein:

FIG. 6A is a plan view of an assembled battery according to the first embodiment;

FIG. 6B is a front view of the assembled battery according to FIG. 6A;

FIG. 6C is a side view of the assembled battery according to FIG. 6A;

DETAILED DESCRIPTION OF EMBODIMENTS OF THE INVENTION

Figure 1:
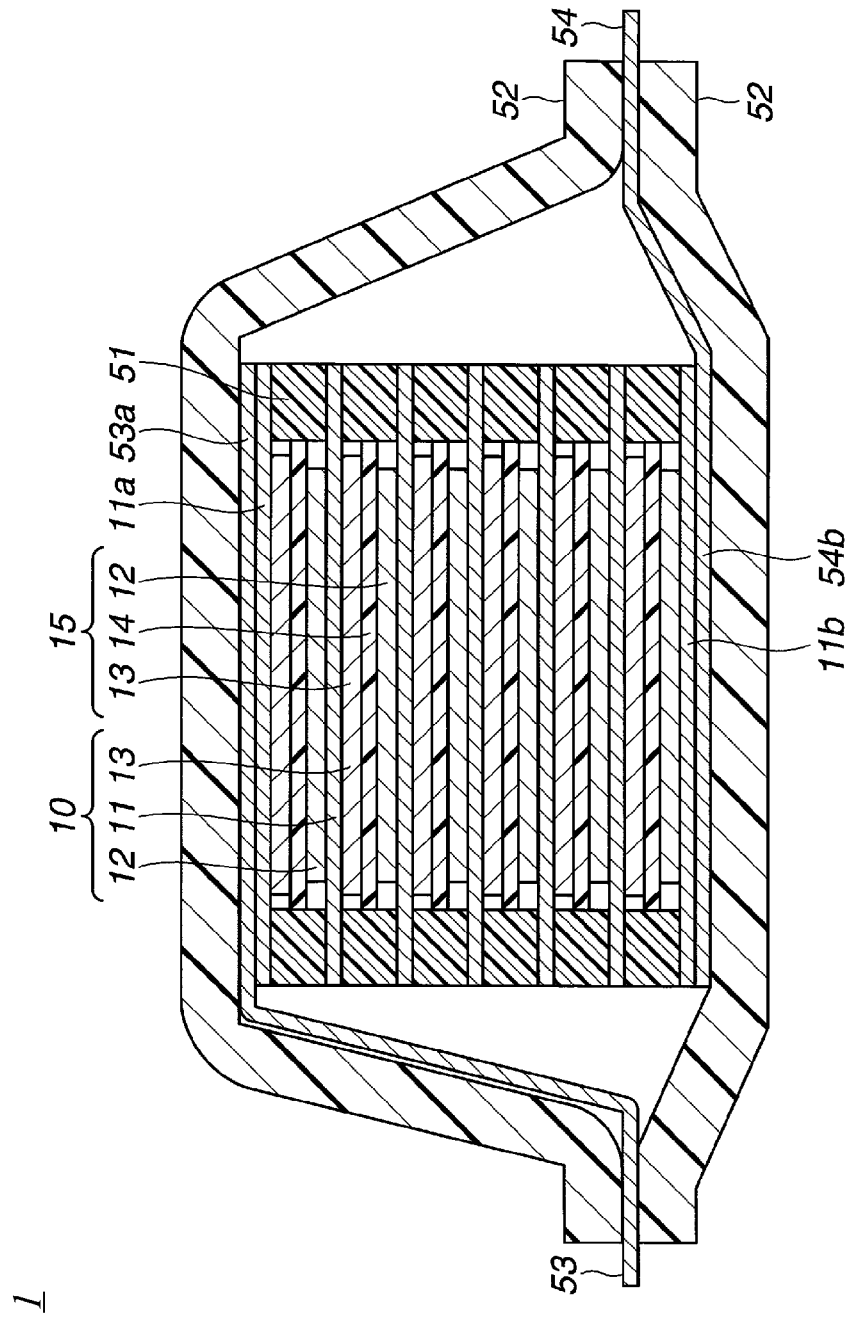
FIG. 1 is an explanatory diagram illustrating a schematic inside construction of a bipolar secondary battery according to a first embodiment of the invention.

Certain embodiments of the invention are explained hereinafter with reference to the accompanying drawings. In the drawings, size and proportion of parts are different from actual size and proportion thereof, and therefore, the size and proportion are exaggerated or simplified only for the sake of facilitating the explanation.

Figure 2A:
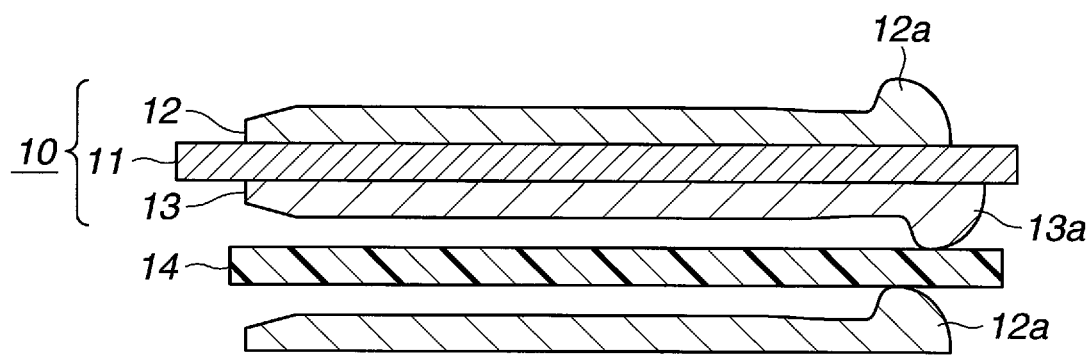
FIG. 2A is a side view of a bipolar electrode that is used in the bipolar secondary battery according to the first embodiment.
Figure 2B:
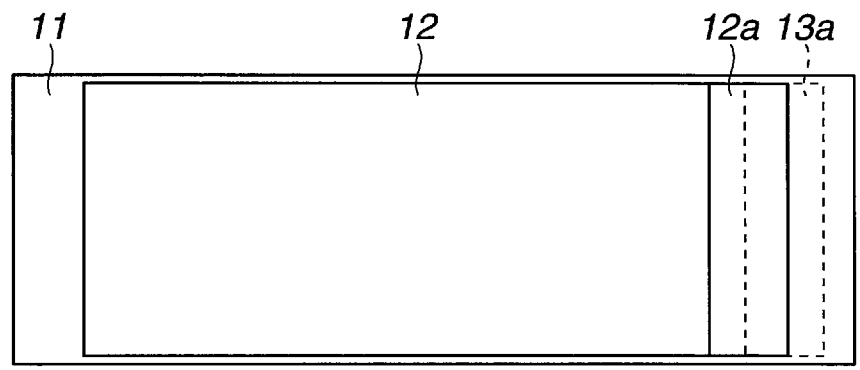
FIG. 2B is a plan view of the bipolar electrode of FIG. 2B when viewed from a side of the positive electrode layer.
Figure 3:
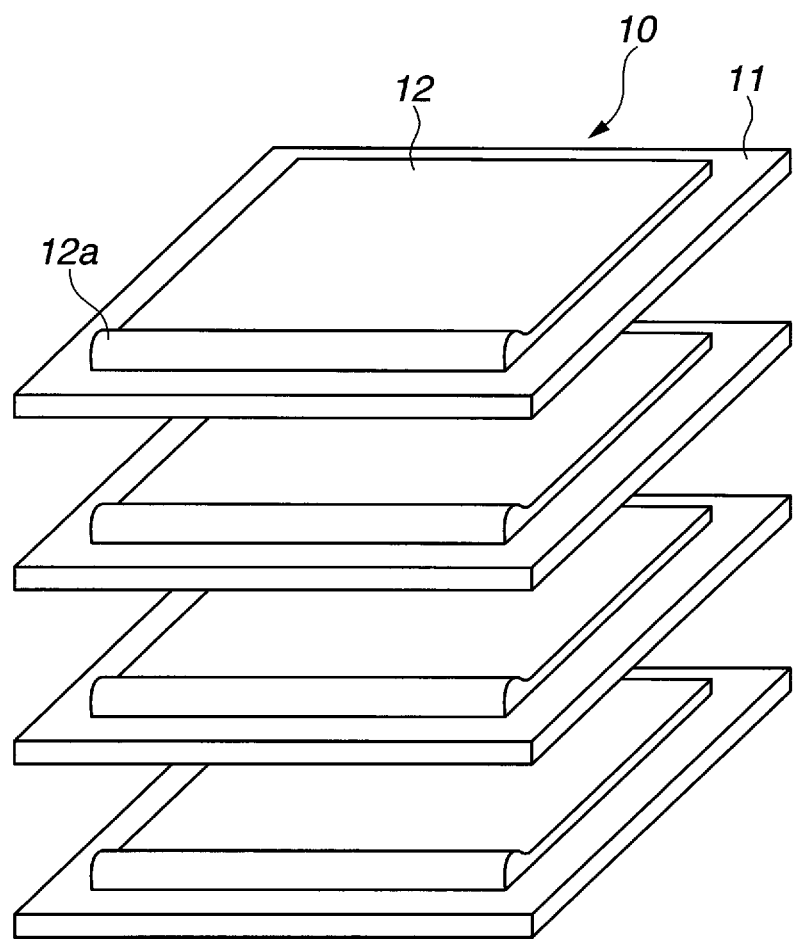
FIG. 3 is a perspective view illustrating a stacking orientation of the bipolar electrodes in the bipolar secondary battery according to the first embodiment.

Referring first to FIGS. 1-3, bipolar secondary battery 1 according to the first embodiment includes a plurality of bipolar electrodes 10 each having positive electrode layer (first electrode layer) 12 formed on a first surface of current collector 11 and negative electrode layer (second electrode layer) 13 formed on a second surface of current collector 11. The second surface is opposed to the first surface. Positive electrode layer 12 and negative electrode layer 13 contain positive and negative active materials, respectively.

FIG. 1 shows a basic structure of bipolar secondary battery 1 and refrains from showing details of bipolar electrode 10 (see FIG. 2A showing the details).

Bipolar electrodes 10 are stacked on each other via separator 14 that contains an electrolyte. Positive electrode layer 12, separator 14 and negative electrode layer 13 constitute unit cell 15. Current collector 11 that is disposed at an outer-most position (called outer-most current collectors 11a and 11b) has either one of negative electrode layer 13 or positive electrode layer 12 on only one of the first and second surfaces.

Unit cell 15 has seal member 51 on an outer peripheral surface thereof, which insulates adjacent current collectors 11 from each other.

These structural elements (generating elements) are sealed by lamination sheet 52. Current collector plates 53a and 54b are disposed on an outside of negative electrode-side outer-most current collector 11a and an outside of positive electrode-side outer-most current collector 11b, respectively. Current collector plates 53a and 54b are extended to form negative tab 53 and positive tab 54, respectively. Current collector plates 53a and 54b each have a thickness larger than a thickness of current collector 11, thereby facilitating collection of electric current from a plurality of unit cells 15 that are stacked on each other.

Instead of provision of current collector plates 53a, 54b, outer-most current collectors 11a and 11b can be increased in thickness and extended to an outside of laminate sheet 52 such that these extended portions serve as negative tab 53 and positive tab 54, respectively. Further, an electrode active material can be disposed between outer-most current collector 11a and current collector plate 53a and between outer-most current collector 11b and current collector plate 54b. That is, current collector 11 having the electrode active materials on both of the opposite surfaces thereof can be used as the outer-most current collector instead of outer-most current collectors 11a and 11b having the electrode active material only on one of the opposite surfaces thereof.

As shown in FIG. 2A, in bipolar electrode 10 of the first embodiment, positive electrode layer 12 and negative electrode layer 13 are formed on one current collector 11. Protrudent portions (raised portions) 12a and 13a, which are disposed on end portions of positive electrode layer 12 and negative electrode layer 13, respectively, are arranged out of alignment (that is, nonaligned or offset). Protrudent portions 12a and 13a are disposed at application start positions where application of the active materials is started as explained in detail later.

Bipolar secondary battery 1 according to the first embodiment includes bipolar electrodes 10 stacked on each other such that positive electrode layer 12 and negative electrode layer 13 are opposed to each other along separator 14 disposed therebetween as shown in FIGS. 2A-2B and FIG. 3. With this construction, protrudent portions 12a and 13a disposed at the end portions of the respective electrode layers (positive electrode layer 12 and negative electrode layer 13) are prevented from being in the same position along separator 14, that is, prevented from being aligned in position with each other. For the sake of a simple illustration of the stacked construction, FIG. 3 shows only bipolar electrode 10.

A phenomenon of formation of protrudent portions (or raised portions) 12a and 13a on the end portions of positive electrode layer 12 and negative electrode layer 13 is now explained.

During formation of positive electrode layer 12 and negative electrode layer 13 on current collector 11, a slurry of active materials (viscous liquid having consistency) that form the respective electrode layers is applied onto current collector 11, and then dried. In the application process, the slurry of the active material is pushed out from a slit nozzle while moving a slit nozzle over collector 11. At the application start position, the slurry is pushed out with the slit nozzle being stopped, and movement of the slit nozzle is started from the time when an amount of the slurry is dropped on the surface of current collector 11. Therefore, the slurry adhered to the surface of current collector 11 has a coating thickness slightly larger than a desired thickness of the active material at the application start position. The slurry disposed at the application start position has a large bulk and rises up due to surface tension and elasticity of the slurry as compared to the remaining portion of the slurry that is applied to a position other than the application start position. This results in the formation of protrudent portions 12a and 13a at the end portions of the respective electrode layers.

Thus, formation of protrudent portions 12a and 13a is frequently and remarkably caused at the application start position owing to the application process. However, formation of protrudent portions 12a and 13a may also occur at an application termination position or at a lateral end portion of the respective electrode layers that is located along a direction of application of the slurry, depending on an application method and viscosity of the slurry. Therefore, in a case where a method that causes the raised portion (the protrudent portion) at a position other than the application start position is adopted, it is preferred that the end portion of the positive electrode layer and the end portion of the negative electrode layer be prevented from facing to each other in alignment along the separator 14 therebetween.

Figure 4A:
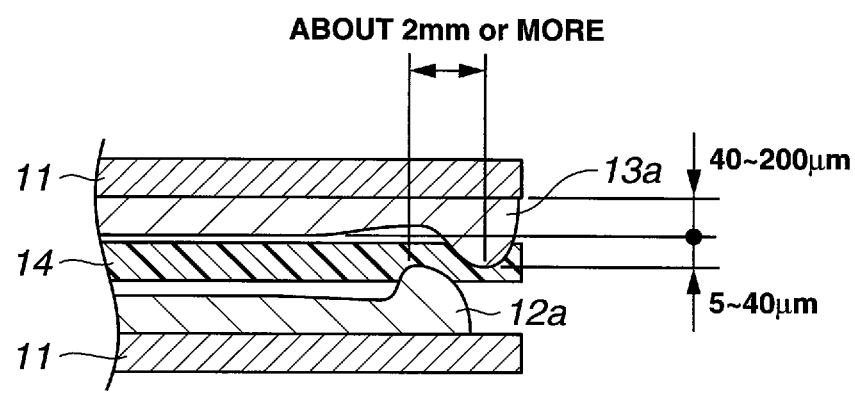
FIGS. 4A and 4B are explanatory diagrams illustrating a function of the bipolar secondary battery according to the first embodiment.
Figure 4B:
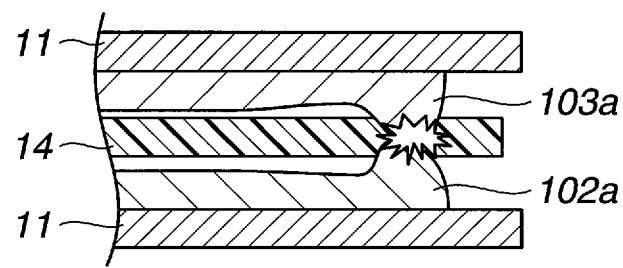

A function of bipolar secondary battery 1 according to this embodiment is now explained with respect to FIGS. 4A and 4B.

In FIG. 4A, protrudent portion 12a of positive electrode layer 12 and protrudent portion 13a of negative electrode layer 13 of a unit cell portion of bipolar secondary battery 1 are disposed out of alignment with each other along separator 14 therebetween. On the other hand, FIG. 4B shows a construction of a unit cell portion of a bipolar secondary battery in which protrudent portion 102a of positive electrode layer 12 and protrudent portion 103a of negative electrode layer 13 are aligned with each other along a side of the same periphery of separator 14.

A size (a height) of the respective protrudent portions varies depending on the viscosity of the slurry that is applied to form positive electrode layer 12 and negative electrode layer 13 and the device applying the slurry. In the sectional view as shown in FIG. 4A, which is taken in a direction of stacking the respective layers, each electrode layer (positive electrode layer 12 and negative electrode layer 13) is formed so as to have a thickness of about 40 to 200 µm, which extends from the surface of current collector 11, and the respective protrudent portions have a size of about 5 to 40 µm, which extends from a planar portion (surface) of the respective electrode layers.

In each of the unit cells of bipolar secondary battery 1 of the first embodiment, protrudent portion 12a of positive electrode layer 12 and protrudent portion 13a of negative electrode layer 13 are disposed in positions offset from each other as shown in FIG. 4A. Therefore, protrudent portion 12a and protrudent portion 13a are located out of alignment with each other along separator 14 located therebetween. As a result, even if the unit cell is pressed in upward and downward directions thereof, separator 14 may be slightly deformed but can be free from undergoing local pressure from both sides of separator 14. Accordingly, separator 14 can be prevented from suffering from reduction of the thickness and penetration in a local area thereof so that short circuit between the end portion of positive electrode layer 12 and the end portion of negative electrode layer 13 is prevented.

In contrast, as shown in FIG. 4B, when protrudent portion 102a of positive electrode layer 12 and protrudent portion 103a of negative electrode layer 13 are formed at the similar end portions of respective electrode layers 12 and 13, protrudent portions 102a and 103a in the unit cell are located in alignment with each other along separator 14. Therefore, if the unit cell is pressed in upward and downward directions thereof, separator 14 will be locally pressed by protrudent portions 102a and 103a from both sides of separator 14. Accordingly, the locally pressed portion of separator 14 may suffer from reduction in thickness and penetration that could cause an internal short circuit within the unit cell. Further, even if no short circuit occurs in an initial manufacturing stage, repeated vibrations of bipolar battery 1 during use over time could cause such a short circuit, reducing battery efficiency.

In the first embodiment described above, protrudent portion 12a of positive electrode layer 12 and protrudent portion 13a of negative electrode layer 13 are located in the positions offset from each other. With this arrangement, even if vibration is applied to bipolar secondary battery 1 for a long time period when used, occurrence of internal short circuit can be suppressed.

Preferably, an amount of the offset between protrudent portions 12a and 13a (the application start positions) of positive electrode layer 12 and negative electrode layer 13, which are respectively disposed on the first surface and the second surface of current collector 11, is, for instance, 2 mm or more in a sectional view taken in the stacking direction. The reason therefor is as follows. Since protrudent portions 12a and 13a may be formed in such a portion of the active material applied, extending up to about 2 mm from an outer-most portion (edge thereof), the raised portions can be prevented from interfering with each other when an amount of the offset therebetween is set to about 2 mm or more. An upper limit of the offset amount particularly is not limited as long as the amount is 2 mm or more, in view of suppressing an internal short circuit. However, if the offset amount is excessively large, then the size of one electrode layer, here positive electrode layer 12, may become too small. In one embodiment, an offset amount of about 5 mm is satisfactory as an upper limit value. Further, the offset amount can be set to at least ten times the thickness of positive electrode layer 12 or negative electrode layer 13 from the surface of current collector 11, or can be set to about not less than fifty times the height of protrudent portion 12a or 13a that extends from the planar portion of the corresponding electrode layer. In this case, the offset amount of about 5 mm may also be satisfactory.

Although the function of preventing separator 14 from suffering from occurrence of an internal short circuit due to application of pressure to a local area of separator 14 from both sides of separator 14 is explained by referring to FIGS. 4A and 4B, the first embodiment may also perform a function of preventing the current collector 11 from suffering from such an internal short circuit.

Figure 15A:
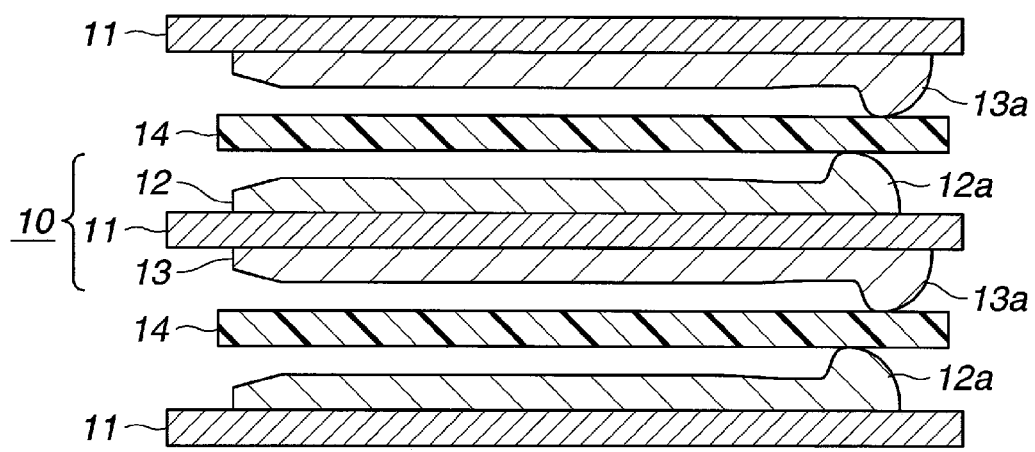
FIGS. 15A and 15B are explanatory diagrams illustrating the other function of the bipolar secondary battery according to the first embodiment.
Figure 15B:
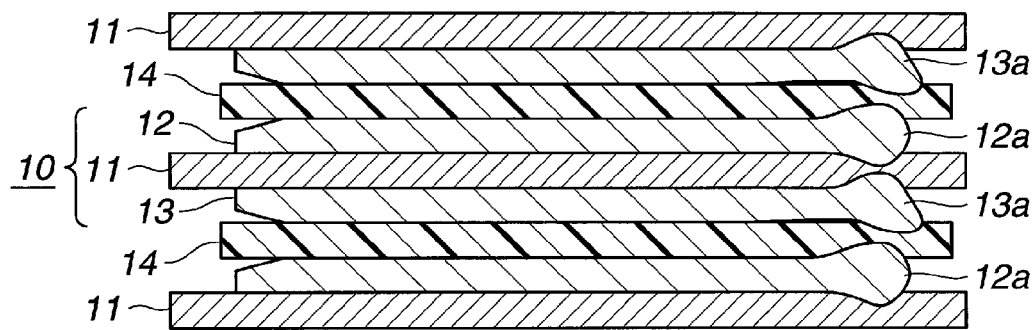

FIGS. 15A and 15B illustrate this function. As shown in FIG. 15A, bipolar secondary battery 1 of the first embodiment includes bipolar electrode 10 in which positive electrode layer 12 and negative electrode layer 13 are disposed on the opposite surfaces of a sheet of current collector 11 as explained above. In this construction, protrudent portions 12a and 13a, which are located at the application start positions of the respective active materials for positive electrode layer 12 and negative electrode layer 13, are offset from each other with respect to current collector 11. That is, the end portion of positive electrode layer 12 formed on the first surface of the sheet of current collector 11 and the end portion of negative electrode layer 13 formed on the second surface of the sheet of current collector 11 that is opposed to the first surface are out of alignment with each other.

Here, in bipolar secondary battery 1, the generating elements are sealed by laminate sheet 52 as shown in FIG. 1. Therefore, a compression force is exerted on current collector 11 in the direction of stacking the layers. In a case where protrudent portion 12a at the end portion of positive electrode layer 12 and protrudent portion 13a at the end portion of negative electrode layer 13 are located in alignment with each other, a force may be exerted on a local area of current collector 11 through protrudent portions 12a and 13a. If the exertion of the force to the local area continues for a long time period, current collector 11 may suffer from penetration or breakage thereat.

The material for current collector 11 is basically metal as explained in detail later. The thickness of current collector 11 is very small, for instance, not more than 100 µm, and may be 50 µm, 25 µm, or less in some cases. Therefore, in a case where current collector 11 has an extremely small thickness, penetration or breakage can result due to continuous exertion of a pressure on a local area of current collector 11 even though current collector 11 is made of a metal material. In particular, where bipolar secondary battery 1 is installed to a vehicle as explained later, the local area of current collector 11 that undergoes pressure may suffer from a larger force due to vibration transmitted from the vehicle, so that the penetration or breakage will be more likely to occur.

Further, the material for current collector 11 may be a non-metal material, and may be, for example, a conductive resin as explained in detail later. Even in such a case, there is a risk of occurrence of penetration or breakage.

Once current collector 11 undergoes penetration or breakage, the positive electrode active material and the negative electrode active material will come into direct contact with each other to thereby cause short circuit or unexpected cell reaction therebetween via current collector 11 through the battery electrolyte.

In the first embodiment, as shown in FIG. 15A, protrudent portions 12a and 13a on the end portions of positive electrode layer 12 and negative electrode layer 13, which are respectively formed on the first surface and the second surface of a sheet of current collector 11, are disposed at positions offset from each other. Owing to the offset between protrudent portions 12a and 13a, as shown in FIG. 15B, even when a compression force is applied to the generating elements in the stacking direction, current collector 11 can be prevented from undergoing pressure applied to the same local area of current collector 11 from both sides of current collector 11 by protrudent portions 12a and 13a. As a result, it is possible to prevent current collector 11 from being penetrated or broken.

An amount of offset between protrudent portions 12a and 13a may be, for instance, 2 mm or more, similar to the amount of offset thereof in separator 14. An upper limit of the offset amount may be about 5 mm at the maximum, similar to the upper limit thereof in separator 14.

In the first embodiment, bipolar secondary battery 1 is constructed so as to perform both of the functions explained by referring to FIGS. 4A-4B and FIGS. 15A-15B. This is because bipolar electrode 10 is produced by applying the respective active materials for positive electrode layer 12 and negative electrode layer 13 to current collector 11 at the application start positions different from each other, and bipolar electrodes 10 are stacked on each other such that positive electrode layer 12 and negative electrode layer 13 are opposed to each other along separator 14 therebetween. With this construction, it is possible to simultaneously avoid occurrence of an internal short circuit due to local pressure applied to separator 14 and occurrence of an internal short circuit due to the local pressure applied to current collector 11.

Bipolar secondary battery 1 can also be constructed such that only either one of the above-described functions is performed. Specifically, protrudent portions 12a and 13a, which are respectively located on the end portions of positive electrode layer 12 and negative electrode layer 13, can be offset relative to each other on the opposite sides of separator 14, but protrudent portions 12a and 13a can be disposed in alignment with each other along current collector 11 therebetween. With this construction, it is possible to positively avoid occurrence of an internal short circuit due to local pressure applied to separator 14. Alternatively, protrudent portions 12a and 13a, which are respectively located on the end portions of positive electrode layer 12 and negative electrode layer 13, can be disposed out of alignment with each other on the first and second surfaces of current collector 11, but protrudent portions 12a and 13a can be disposed in alignment with each other along separator 14 therebetween. In this case, it is possible to positively avoid occurrence of an internal short circuit due to local pressure applied to current collector 11. Thus, either one of the above-described functions can be selectively performed.

Next, a method for manufacturing bipolar secondary battery 1 of the first embodiment is explained.

Bipolar electrode 10 in which protrudent portion 12a of positive electrode layer 12 and protrudent portion 13a of negative electrode layer 13 are positioned out of alignment with each other as shown in FIGS. 2A-2B is prepared as follows. The active material for positive electrode layer 12 is applied to the first surface of current collector 11 and dried to form positive electrode layer 12. The active material for negative electrode layer 13 is applied to the second surface of current collector 11 and dried to form negative electrode layer 13. The respective active materials are applied to the first surface and the second surface of current collector 11 along the same direction with the application start positions being offset from each other. Where a slit nozzle having a same width is used, it is preferred, but not necessary, that negative electrode layer 13 be formed larger in size than positive electrode layer 12. Therefore, application of the active material for negative electrode layer 13 is started from an outermost side periphery of current collector 11. On the other hand, application of the active material for positive electrode layer 12 is started from a position inwardly offset from the end of negative electrode layer 13 in the same direction as the direction of applying the active material for negative electrode layer 13. As a result, a surface area of negative electrode layer 13 becomes larger than a surface area of positive electrode layer 12. By thus forming positive electrode layer 12 and negative electrode layer 13, it is possible to suppress formation of a lithium dendrite due to repetition of the charge and discharge cycle of bipolar secondary battery 1. The application of the active material for negative electrode layer 13 can be carried out preceding the application of the active material for positive electrode layer 12 or vice versa.

However, outer-most current collectors 11a and 11b, which are formed with one of positive electrode layer 12 and negative electrode layer 13 on only one of the opposite surfaces, are prepared.

Subsequently, a plurality of prepared bipolar electrodes 10 are stacked on one another as shown in FIG. 3 such that positive electrode layer 12 and negative electrode layer 13 are opposed to each other along separator 14 therebetween, and protrudent portions 12a and 13a are positioned out of alignment. At the time of stacking, seal member 51 also is fitted to an outer periphery of each unit cell 15.

In this case, in each of the plurality of bipolar electrodes 10 to be stacked, the application start positions for the active materials for positive electrode layer 12 and negative electrode layer 13 may be located on any side of the respective bipolar electrodes 10 when viewed in its plane direction. In FIG. 3, in all of the plurality of bipolar electrodes 10 to be stacked, the ends of the application start positions for the active materials for positive electrode layer 12 and negative electrode layer 13) are located on the right side when viewed in their plane direction (FIG. 2A). Note that the right side in FIG. 2A corresponds to the bottom side in FIG. 3, while the left side in FIG. 2A corresponds to the top side in FIG. 3. However, in the plurality of bipolar electrodes 10 to be stacked, the ends of the application start positions for the active materials for positive electrode layer 12 and negative electrode layer 13 may also be located on the left side of FIG. 2A. This is because in each of bipolar electrodes 10 of the first embodiment, the application start positions for the active materials for positive electrode layer 12 and negative electrode layer 13 are offset from each other, so that protrudent portions 12a and 13a are formed at the application start positions of positive and negative electrode layers 12 and 13.

Subsequently, as shown in FIG. 1, electrode tabs 53 and 54 are pulled out, and the stacked body is sealed with laminate sheet 52 to complete bipolar secondary battery 1.

In the embodiment as discussed above, only protrudent portions 12a and 13a, which are formed at the application start positions for the active materials for positive and negative electrode layers 12 and 13, are located out of alignment with each other. However, the other end portions of positive and negative electrode layers 12 and 13 that are disposed at the application termination positions for the active materials for positive and negative electrode layers 12 and 13 may also be located out of alignment with each other.

Figure 5:
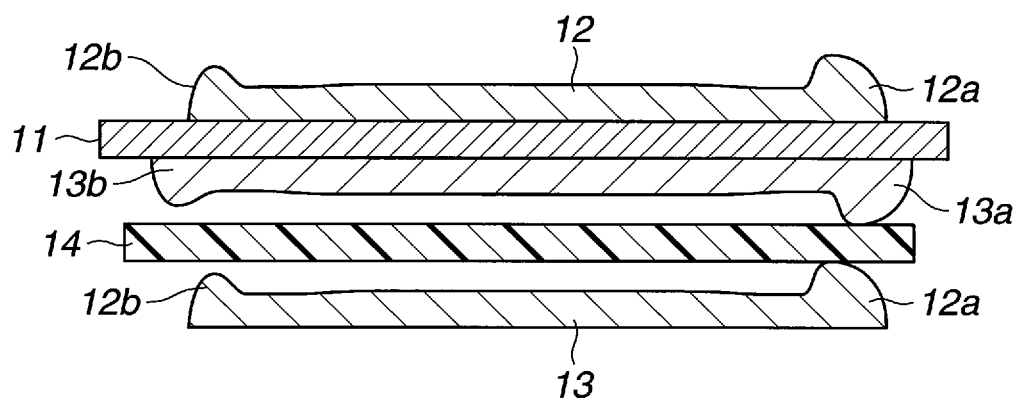
FIG. 5 is an explanatory diagram illustrating the bipolar electrode in which an end portion disposed at an application start position and an end portion disposed at an application termination position are arranged in offset relation to each other.

FIG. 5 is an explanatory diagram illustrating bipolar electrode 10 in which protrudent portions 12a and 13a formed at the application start positions for the active materials for positive and negative electrode layers 12 and 13 as well as protrudent portions 12b and 13b formed at the application termination positions for the active materials for positive and negative electrode layers 12 and 13 both are located out of alignment with each other.

In bipolar electrode 10 shown in FIG. 5, protrudent portions 12b and 13b formed at the application termination positions for the active materials for positive and negative electrode layers 12 and 13 disposed on the opposite sides of a sheet of current collector 11 are configured such that protrudent portion 12b is inwardly offset from protrudent portion 13b.

With the above arrangement, within each unit cell 15, protrudent portions 12b and 13b formed at the application termination positions for the active materials for positive and negative electrode layers 12 and 13 are located out of alignment with each other as are protrudent portions 12a and 13a formed at the application start positions for the active materials for positive and negative electrode layers 12 and 13.

As explained previously, the active materials applied have various raised portions depending on a variety of application methods, but in general, the raised active materials have increased heights at the application start positions. However, in some cases, the active materials applied also have the raised portions at the application termination positions. Accordingly, even when the active materials are applied by a method where raised portions of the active materials are also formed at the application termination positions, it is possible to avoid internal short circuits by displacing protrudent portions at the ends of positive and negative electrode layers 12 and 13 from each other, not only at the application start position, but also at the application termination positions, as shown in FIG. 5.

The respective parts of bipolar secondary battery 1 of the first embodiment are explained hereinafter.

The first part of bipolar secondary battery 1 of the first embodiment described is current collector 11.

Current collector 11 is formed of a conductive material and has a positive electrode layer on one surface thereof (for instance, the first surface) and a negative electrode layer on the other surface thereof (for instance, the second surface) as explained above. Current collector 11 that is disposed at an outermost position is formed with the electrode (positive electrode or negative electrode) on only an inboard facing side of the generating elements. A size of current collector 11 is determined depending on application of the battery. For instance, current collector 11 having a large area size is useable for a large battery that requires high energy density.

The material for current collector 11 is not limited to a specific material as long as the material has electrical conductivity. For instance, metals and conductive polymers can be adopted. Specific examples of the materials include metal materials such as aluminum, nickel, iron, stainless steel, titanium and copper. In addition, a clad metal material formed of nickel and aluminum, a clad metal formed of copper and aluminum, and a plating material formed of any combination of the above metals can also be used. Further, a foil formed by covering a metal surface with aluminum can also be used.

Among the above materials, aluminum and copper are preferred in view of electronic conductivity and battery activating electric potential.

A thickness of current collector 11 is not specifically limited as long as the function of current collector 11 can be performed. For instance, the thickness of current collector 11 according to certain embodiments is preferably within a range of 0.1 to 100 μm. The current collector 11 having such a thickness serves to reduce a weight of the battery as a whole in a case where a plurality of unit cells 15 are stacked (for instance, several tens or not less than one hundred layers).

Further, current collector 11 can be formed of conductive resin. The conductive resin useable for current collector 11 may be, for example, in the form of a resin layer having electric conductivity that is formed in collector 11. The resin layer having electric conductivity is provided in specific forms. One form of the resin layer may include a resin material and a conductive material (conductive filler). The other form of the resin layer may include a conductive polymer as the polymer material for the resin. The form of the resin layer that includes a resin material and a conductive material is more preferred in certain embodiments in view of the large choice in selecting the resin material and the conductive material.

The other form of the resin layer including a conductive polymer as the polymer material for the resin is now briefly explained. The conductive polymer may be selected from materials that have electric conductivity but no conductivity to ions that are used as an electric charge transporting medium. The conductive polymer is considered to exhibit the conductivity owing to an energy band thereof that is formed by conjugated polyene. Typical examples of the polyene-based conductive polymer include those which have now been practically used for an electrolytic capacitor. Specific examples of the preferred polyene-based conductive polymer include polyaniline, polypyrrole, polythiophene, polyacetylene, polyparaphenylene, polyphenylenevinylene, polyacrylonitrile, polyoxadiazole, and a mixture of these polymers. Among these polymers, polyaniline, polypyrrole, polythiophene and polyacetylene are more preferred in view of electronic conductivity and stable use in the battery.

Next, one exemplary resin layer including a resin and an electrically conductive material is now explained. The electrically conductive material (electrically conductive filler) can be selected from materials having electric conductivity. It is preferred but not necessary to use materials that do not have conductivity to ions that are used as an electric charge transporting medium in view of suppressing ion permeation in the resin layer having electric conductivity.

Certain examples of the electrically conductive material are aluminum material, stainless steel (SUS) material, carbon material such as graphite and carbon black, silver material, gold material, copper material and titanium material, although the electrically conductive material is not particularly limited thereto. These electrically conductive materials can be used solely or in combination of any two or more thereof. These electrically conductive materials may also be used in the form of an alloy thereof. Among these electrically conductive materials, silver material, gold material, aluminum material, stainless steel (SUS) material and carbon material are preferred, while carbon material is more preferred. Further, the electrically conductive material can also be a particulate ceramic material or a resin material coated with the electrically conductive material described above by plating or the like.

A shape (or form) of the electrically conductive material may be a particulate form, although it is not limited thereto.

The shape of the electrically conductive material may be a form other than the particulate form that has been practically used in a so-called filler-based electrically conductive resin composition, such as carbon nanotube.

Examples of the carbon material other than carbon black and graphite are a carbon fiber and a c/c composite (i.e., a mixture of graphite and carbon fiber). Carbon particles such as carbon black and graphite have a very wide potential window and exhibit good stability to both positive electrode potential and negative electrode potential over a wide range as well as excellent electric conductivity. In addition, the carbon particles have an extremely light weight, thereby serving for minimizing an increase in mass of the battery. Further, the carbon particles tend to be usually used as an electrically conducting assistant for enhancing the conductivity of electrodes. Therefore, even if the electrode is brought into contact with the carbon particles as the electrically conducting assistant, the contact resistance caused between the electrode and the electrically conducting assistant can be considerably reduced because the electrode and the electrically conducting assistant are formed of the same material. In a case where the carbon particles are used as electrically conductive particles, it is possible to reduce compatibility with an electrolyte by subjecting a surface of the carbon particles to hydrophobic treatment and thereby preventing pores of the current collector from being readily impregnated with the electrolyte.

An average particle diameter of the electrically conductive material is not specifically limited, but is preferably about 0.01 to 10 μm. The term "particle diameter" as used herein means a maximum distance L among distances between two points on a particle profile of the electrically conductive material. As the "average particle diameter", there is adopted the value calculated as an average of particle diameters of particles that are observed in several to several-ten fields of view using an observation device such as a scanning electron microscope (SEM), transmission electron microscope (TEM), or the like. A particle diameter and an average particle diameter of particles of the below-mentioned active material may be defined in the same manner.

Further, in the case of the form in which the resin layer contains electrically conductive material, the resin forming the resin layer may contain a polymeric material that acts to bind the electrically conductive material and has no electrical conductivity, in addition to the electrically conductive material. By using the polymeric material as a material constituting the resin layer, it is possible to enhance binding properties of the electrically conductive material and thereby increase reliability of the battery. The polymeric material can be selected from materials that can withstand the positive electrode potential and the negative electrode potential applied to the current collector.

Examples of the polymeric material are polyethylene (PE), polypropylene (PP), polyethylene terephthalate (PET), polyether nitrile (PEN), polyimides (PI), polyamides (PA), polytetrafluoroethylene (PTFE), styrene butadiene rubber (SBR), polyacrylonitrile (PAN), polymethyl acrylate (PMA), polymethyl methacrylate (PMMA), polyvinyl chloride (PVC), polyvinylidene fluoride (PVdF), epoxy resins and a mixture thereof. These materials have a very wide potential window and exhibit stability to both positive electrode potential and negative electrode potential. In addition, these materials have light weight to thereby allow the battery to exhibit high output density.

A proportion of the electrically conductive material present in the resin layer is not specifically limited and can be, for example, 1 to 30% by mass based on a total mass of the polymeric material and the electrically conductive material. Owing to the presence of a sufficient quantity of the electrically conductive material, the electrical conductivity of the resin layer can be fully ensured.

The resin layer may contain an additive other than the electrically conductive material and the resin, but it is preferred that the resin layer is composed solely of the electrically conductive material and the resin.

The resin layer can be manufactured by conventionally known methods, for instance, by spraying or coating. Specifically, the resin layer can be formed by preparing a slurry containing the polymeric material and then applying and curing the slurry. A specific form of the polymeric material to be used for preparation of the slurry is as described above, and therefore, explanations therefor are omitted here. Another component that may be contained in the slurry is an electrically conductive material. Specific examples of the electrically conductive material are those described above, and therefore, explanations therefor are omitted here. Alternatively, the resin layer can also be obtained by mixing the polymeric material, the electrically conductive material and other additives by a conventionally known mixing method, and then molding the obtained admixture into a film. Further, for instance, the resin layer can be produced by an inkjet printing method as described in Japanese Patent Application Laid-Open No. 2006-190649.

A thickness of the current collector is not specifically limited, but it is preferably as thin as possible but thick enough to increase the power output density of the battery. In the bipolar electrode battery, the resin current collector that exists between the positive electrode and the negative electrode can have a high electric resistance in a direction horizontal to the stacking direction. Therefore, it is possible to reduce the thickness of the current collector. Specifically, the thickness of the current collector is 0.1 to 150 μm in certain embodiments and is more preferably 10 to 100 μm other embodiments.

Next described are the positive electrode layer 12 and negative electrode layer 13 of the first embodiment of bipolar secondary battery 1.

Positive electrode layer 12 and negative electrode layer 13 respectively contain an active material and may further contain other additives if necessary.

Examples of the positive electrode active material are $LiMn_2O_4$, $LiCoO_2$, $LiNiO_2$, $Li(Ni-Co-Mn)O_2$ and lithium-transition metal composite oxides in which other elements are substituted for a part of the transition metals, phosphate compounds containing lithium and a transition metal, sulfate compounds containing lithium and a transition metal and the like. These positive electrode active materials may be used in combination of any two or more thereof. Among these positive electrode active materials, lithium-transition metal composite oxides are preferred. Other positive electrode active materials may also be used in embodiments of the invention.

Examples of the negative electrode active material are a carbon material such as graphite, soft carbon and hard carbon, lithium-transition metal composite oxides (for instance, $Li_4Ti_5O_{12}$), a metal material and a lithium-metal alloy material. These negative electrode active materials may be used in combination of two or more thereof. Among these negative electrode active materials, the carbon material and the lithium-transition metal composite oxides are preferred. Other negative electrode active materials may also be used in the present invention.

Further, examples of the additive are a binder, an electrically conducting assistant, an electrolyte salt (lithium salt) and an ion-conductive polymer.

The electrically conducting assistant is an additive for enhancing a conductivity of the positive electrode active material or the negative electrode active material. The electrically conducting assistant may include, for instance, a carbon material such as carbon black such as acetylene black, graphite, vapor-phase epitaxy carbon fiber and the like. In a case where the active material layer contains the electrically conducting assistant, an electronic network can be effectively formed in the active material layer to thereby serve to enhance an output performance of the battery.

Examples of the electrolyte salt (lithium salt) are $Li(C_2F_5SO_2)_2N$, $LiPF_6$, $LiBF_4$, $LiClO_4$, $LiAsF_6$ and $LiCF_3SO_3$.

Examples of the ion-conductive polymer are polyethylene oxide (PEO)-based polymers and polypropylene oxide (PPO)-based polymers.

A ratio of components contained in the positive electrode active material and the negative electrode active material is not specifically limited. The ratio can be controlled by suitably referring to conventionally known findings concerning a non-aqueous solvent secondary battery.

A thickness of each of the positive and negative electrode active materials is not specifically limited and can be controlled by suitably referring to conventionally known findings concerning a battery.

The third part of bipolar secondary battery 1 according to the first embodiment described herein is separator 14.

Separator 14 may be, for example, a fine porous film made of polyolefin such as polyethylene and polypropylene. Separator 14 is impregnated with a liquid electrolyte.

The liquid electrolyte may be produced by dissolving a lithium salt as a supporting salt in an organic solvent as a plasticizer. Examples of the organic solvent useable as a plasticizer are ethylene carbonate (EC), propylene carbonate (PC) and the like. Examples of the supporting salt (lithium salt) are compounds that can be added to the electrode active material layers such as LiBETI.

Instead of separator 14 impregnated with such a liquid electrolyte, a polymer electrolyte can be used by itself as separator 14. The polymer electrolyte is classified into a gel electrolyte containing a liquid electrolyte and an intrinsic-polymer electrolyte containing no liquid electrolyte.

The gel electrolyte has a structure in which the liquid electrolyte is injected into a matrix polymer constituted of an ion-conductive polymer. Examples of the ion-conductive polymer used as the matrix polymer are polyethylene oxide (PEO), polypropylene oxide (PPO) and copolymers thereof. The electrolyte salt such as a lithium salt is well dissolved in these polyalkylene oxide-based polymers.

If the electrolyte layer is formed of the liquid electrolyte and the gel electrolyte, the electrolyte layer can be used as separator 14. In this case, a specific form of separator 14 may be, for example, a fine porous film made of polyolefin such as polyethylene and polypropylene.

The intrinsic-polymer electrolyte has a structure in which a supporting salt (lithium salt) is dissolved in the matrix polymer as described above with no organic solvent as a plasticizer. Accordingly, in a case where the electrolyte layer is formed of the intrinsic-polymer electrolyte, leakage of liquid from the battery can be prevented to thereby enhance reliability of the battery.

The matrix polymer of the gel electrolyte or the intrinsic-polymer electrolyte creates a crosslinked structure to thereby impart excellent mechanical strength to the separator. The crosslinked structure can be formed by subjecting polymerizable polymers (for instance, PEO and PPO) for forming a polymeric electrolyte to polymerization treatment such as thermal polymerization, ultraviolet polymerization, radiation polymerization and electron polymerization in the presence of a suitable polymerization initiator.

Next, an assembled battery utilizing the bipolar secondary battery of the first embodiment is explained with reference to FIGS. 6A-6C.

Assembled battery 300 includes a plurality of detachable/attachable compact assembled batteries 250 formed by electrically connecting a plurality of the bipolar secondary batteries 1 in series or in parallel. Assembled battery 300 that has high-volume energy density and high-volume output density is formed by electrically connecting compact assembled batteries 250 in series or in parallel. Such an assembled battery 300 can be configured to have a large capacity and a large output suitable for a vehicle driving power source and an auxiliary power source.

Compact assembled batteries 250 are electrically connected with one another through an electric connection member such as a bus bar and stacked to form multiple layers by means of connecting jig 310. The number of compact assembled batteries 250 to be used may be determined on the basis of the battery capacity and power output as required of the vehicle (e.g. an electric vehicle) that carries the battery.

Assembled battery 300 of this embodiment is excellent in durability because respective bipolar secondary batteries 1 constituting assembled battery 300 also have an excellent durability. Accordingly, it is possible to reduce frequency of replacement of detachable/attachable compact assembled batteries 250 or respective bipolar secondary batteries 1 within assembled batteries 250 due to occurrence of malfunction thereof.

Figure 7:
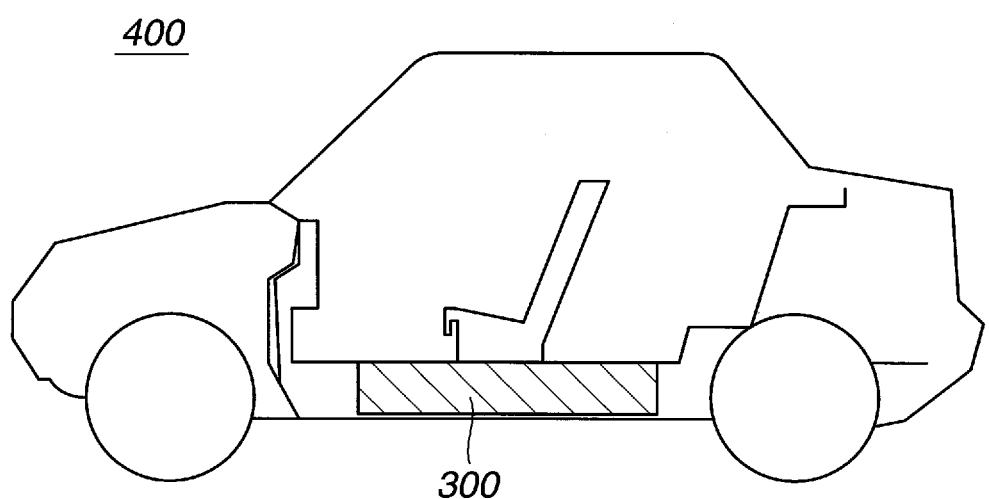
FIG. 7 is an explanatory diagram illustrating a vehicle in which the assembled battery according to the first embodiment is used.

Next, a vehicle that carries the assembled battery is explained with reference to FIG. 7.

Electric vehicle 400 carries assembled battery 300 that is installed below a seat at a central portion of the vehicle body and used as a power source for a motor thereof. By installing assembled battery 300 below the seat, it is possible to increase an internal space and a luggage boot of the vehicle 400. The site for installation of assembled battery 300 is not limited to below the seat and may also be a lower portion of a luggage boot at the rear portion of the vehicle 400 or an engine room at the front portion of the vehicle 400.

Since bipolar secondary battery 1 constituting assembled battery 300 has excellent durability, electric vehicle 400 using assembled battery 300 can provide a sufficient power output even after being used for a long period of time. In particular, bipolar secondary battery 1 is configured to resist an internal short circuit due to vibration. Therefore, bipolar secondary battery 1 is optimum for application to vehicles.

Bipolar secondary battery 1 or assembled battery 300 can be used as the motor power source in vehicles, for instance, a pure electric vehicle that uses no gasoline, a hybrid vehicle such as a series hybrid vehicle and a parallel hybrid vehicle, and a motor-driven vehicle such as a fuel-cell vehicle that drives wheels by a motor. In addition, bipolar secondary battery 1 or assembled battery 300 can be used as various power sources or a secondary battery for a mobile unit such as a two-wheeled vehicle (bike), a three-wheeled vehicle or an electric rail car.

Further, bipolar secondary battery 1 or assembled battery 300 of this embodiment can also be used as a mounting power source for an uninterruptible power supply and the like.

A bipolar electrode that is used in a bipolar secondary battery of a second embodiment of the present invention is initially described with reference to FIGS. 8A, 8B and 9. Although FIG. 9 shows only the bipolar electrode such that other components are omitted, the entire construction of the bipolar secondary battery is the same as shown in FIG. 1.

Figure 8A:
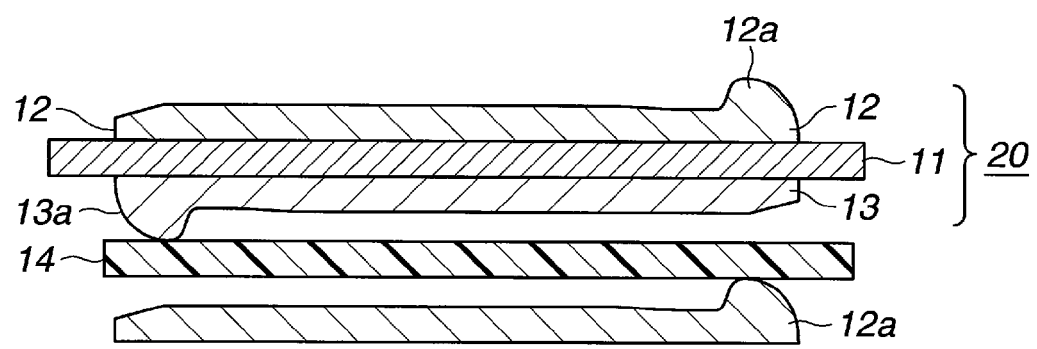
FIG. 8A is a side view of a bipolar electrode that is used in a bipolar secondary battery according to a second embodiment of the invention.
Figure 8B:
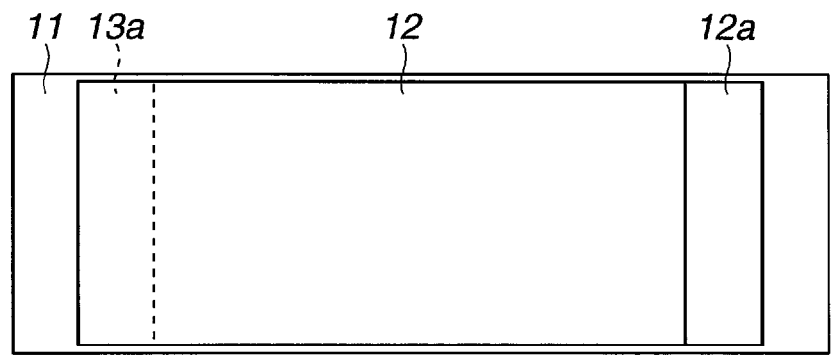
FIG. 8B is a plan view of the bipolar electrode of FIG. 8B when viewed from a side of the positive electrode layer.

As shown in FIGS. 8A-8B, bipolar electrode 20 in the bipolar secondary battery of the second embodiment is configured such that protrudent portions 12a and 13a respectively formed at the application start positions for positive electrode layer 12 and negative electrode layer 13 are located on opposite peripheral edges of current collector 11 on opposed surfaces of current collector 11. That is, application of a slurry of the positive electrode active material is started from one peripheral edge of current collector 11. Subsequently, application of a slurry of the negative electrode active material on the second surface of current collector 11 is started from the other peripheral edge of current collector 11 that is opposed to the peripheral edge of current collector 11 where the slurry of the positive electrode active material is started. Thus, bipolar electrode 20 is formed.

Figure 9:
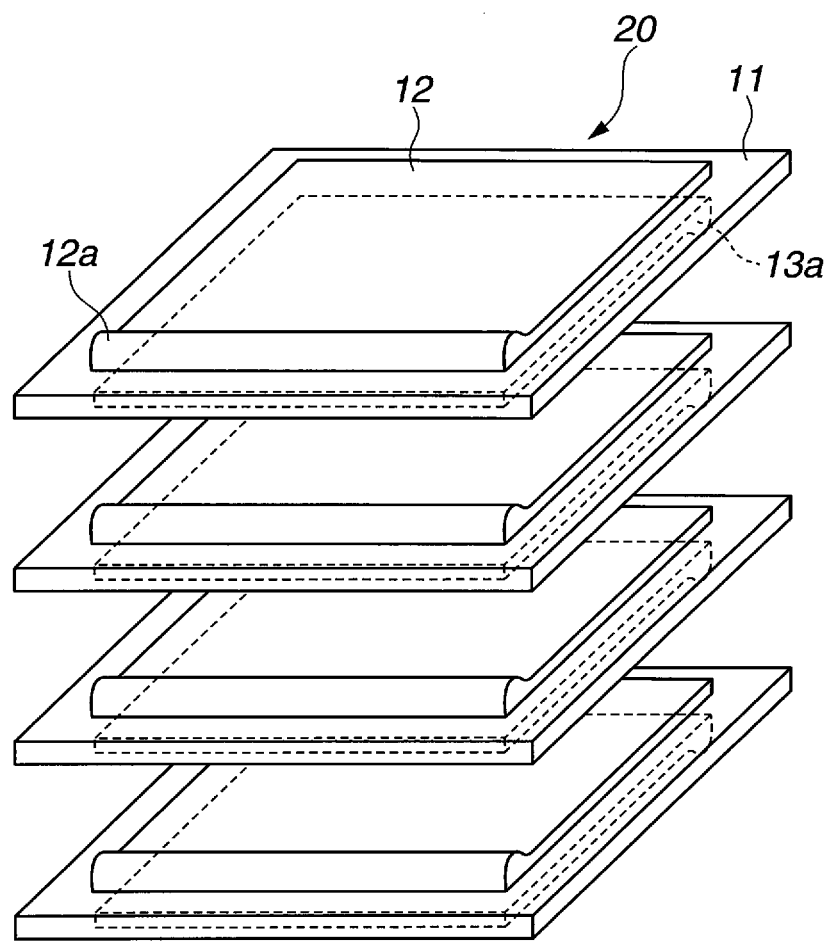
FIG. 9 is a perspective view illustrating a stacking orientation of the bipolar electrodes in the bipolar secondary battery according to the second embodiment.

As shown in FIG. 9, protrudent portions 12a and 13a respectively formed at the application start positions can be prevented from being in alignment with each other similar to the first embodiment by stacking bipolar electrodes 20 on one another via separator 14 therebetween such that positive electrode layer 12 and negative electrode layer 13 are opposed to each other along separator 14 (see FIG. 8A).

Accordingly, and similar to the first embodiment, it is possible to prevent separator 14 from undergoing local pressure within the unit cell 15 and thereby avoid occurrence of an internal short circuit in the unit cell 15. Further, protrudent portion 12a of positive electrode layer 12 and protrudent portion 13a of negative electrode layer 13 are located on opposed sides of current collector 11 disposed between positive and negative electrode layers 12 and 13 and are located out of alignment with each other. With this construction, current collector 11 can be prevented from undergoing local pressure so that occurrence of an internal short circuit in the bipolar electrode 20 can be avoided.

A method of manufacturing the bipolar secondary battery of the second embodiment is the same as that of the bipolar secondary battery of the first embodiment except for the step of preparing bipolar electrode 20 that is different in configuration from that of the first embodiment. Further, the sealing with laminate sheet 52 and the pulling out of the electrode tabs 53, 54 are conducted in the same manner as in the first embodiment.

Further, the materials for the respective parts to be used in the second embodiment may be the same as those in the first embodiment as described above. The bipolar secondary battery of the second embodiment may also constitute an assembled battery, and the assembled battery may be installed to vehicles. The assembled battery and vehicles with an assembled battery can attain excellent durability, similar to those in the first embodiment.

A bipolar electrode that is used in a bipolar secondary battery of a third embodiment of the invention is described with reference to FIGS. 10 and 11. Although FIG. 11 shows only the bipolar electrode such that other components are omitted therein, the entire construction of the bipolar secondary battery is substantially the same as shown in FIG. 1.

In the third embodiment, protrudent portions 12a and 13a respectively formed at the application start positions on positive electrode layer 12 and negative electrode layer 13 by applying the slurries of the electrode active materials to the opposed surfaces of current collector 11 are located on side peripheries of the first and second surfaces of current collector 11 that extend perpendicular to each other in a plan view.

Specifically, when protrudent portion 12a formed at the application start position on positive electrode layer 12 is provided along a side periphery (i.e., a first side) of the first surface of current collector 11, protrudent portion 13a formed at the application start position on negative electrode layer 13 is provided along a side periphery (i.e., a second side) of the second surface of current collector 11 that extends perpendicular to the first side when viewed in plan view.

Figure 10:
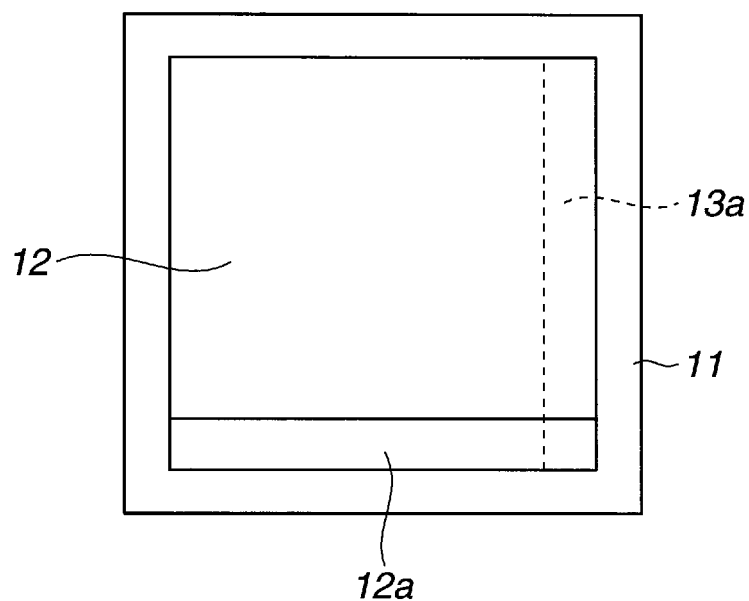
FIG. 10 is a plan view of a bipolar electrode that is used in the bipolar secondary battery according to a third embodiment of the invention viewed from a side of the positive electrode layer.
Figure 11:
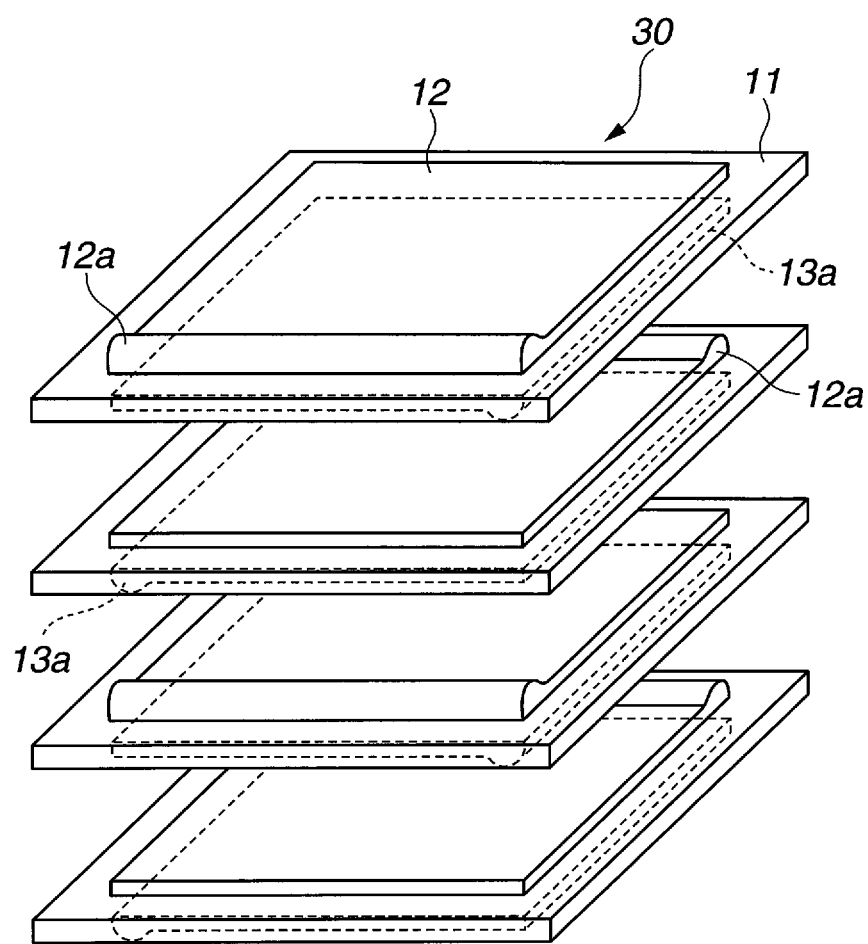
FIG. 11 is a perspective view illustrating a stacking orientation of the bipolar electrodes in the bipolar secondary battery according to the third embodiment.

Bipolar electrode 30 is preferably formed into a square shape as shown in FIG. 10. Where bipolar electrode 30 has a square shape, the application start positions for starting the application of the respective slurries of the positive and negative electrode active materials on the first and second surfaces of current collector 11 are located at positions angularly offset by an angle of 90 degrees relative to each other. Therefore, slit nozzles having a same size can be used to thereby facilitate manufacture of bipolar electrode 30. If slit nozzles different in size (i.e., a width of the slit) from each other are used, the shape of bipolar electrode 30 may be a rectangular shape.

As shown in FIG. 11, bipolar electrodes 30 are stacked on one another such that positive electrode layer 12 and negative electrode layer 13 are opposed to each other on opposite sides of separator 14. Thus, there is provided a bipolar secondary battery including positive and negative electrode layers 12 and 13 with protrudent portions 12a and 13a located on side peripheries of separator 14 that extend perpendicular to each other. That is, protrudent portion 12a of positive electrode layer 12 and protrudent portion 13a of negative electrode layer 13 are disposed on opposite surfaces of separator 14 and are located at positions angularly offset by an angle of 90 degrees relative to each other. Further, protrudent portion 12a of positive electrode layer 12 and protrudent portion 13a of negative electrode layer 13 may also be located at positions angularly offset by an angle of 180 degrees relative to each other.

As described above, protrudent portions 12a and 13a formed at the application start positions for forming positive electrode layer 12 and negative electrode layer 13 can be prevented from being in alignment with each other on opposite sides of separator 14 by providing protrudent portions 12a and 13a at different positions perpendicular to each other. Accordingly, in the third embodiment, similar to the first embodiment, the separator 14 can be free from undergoing local pressure within the unit cell 15 to thereby suppress an internal short circuit in the unit cell 15. Further, in the third embodiment, similar to the first embodiment, protrudent portion 12a of positive electrode layer 12 and protrudent portion 13a of negative electrode layer 13 are located out of alignment with each other. With this construction, current collector 11 can be prevented from undergoing local pressure so that occurrence of an internal short circuit can be avoided.

A method for manufacturing the bipolar secondary battery of the third embodiment is the same as that of the bipolar secondary battery of the first embodiment except for the step of preparing bipolar electrode 30 that is different in the lamination construction from that of the first embodiment. Further, the sealing with laminate sheet 52 and the pulling out of the electrode tabs 53, 54 are conducted in the same manner as those in the first embodiment. The materials for the respective parts to be used in the third embodiment may be the same as those in the first embodiment as described above. Finally, similar to the first embodiment, the bipolar secondary battery of the third embodiment may constitute an assembled battery, and the assembled battery may be installed in vehicles. The assembled battery and vehicles with an assembled battery can attain excellent durability, similar to those in the first embodiment.

Figure 12:
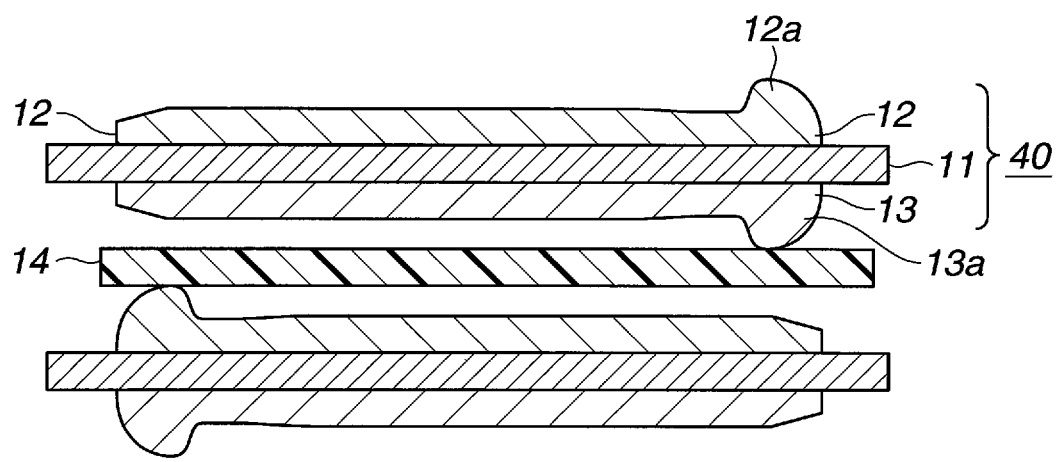
FIG. 12 is a side view illustrating two bipolar electrodes that are disposed adjacent to each other in a stacking direction and used in a bipolar secondary battery according to a fourth embodiment of the invention.

A bipolar electrode that is used in a bipolar secondary battery of a fourth embodiment of the invention is described with reference to FIGS. 12 and 13. Although FIG. 13 shows only the bipolar electrode and other components are omitted therein, the entire construction of the bipolar secondary battery is substantially the same as shown in FIG. 1.

In the fourth embodiment, protrudent portions 12a and 13a respectively formed at the application start positions on positive electrode layer 12 and negative electrode layer 13 in one bipolar electrode 40 are located in alignment with each other.

Figure 13:
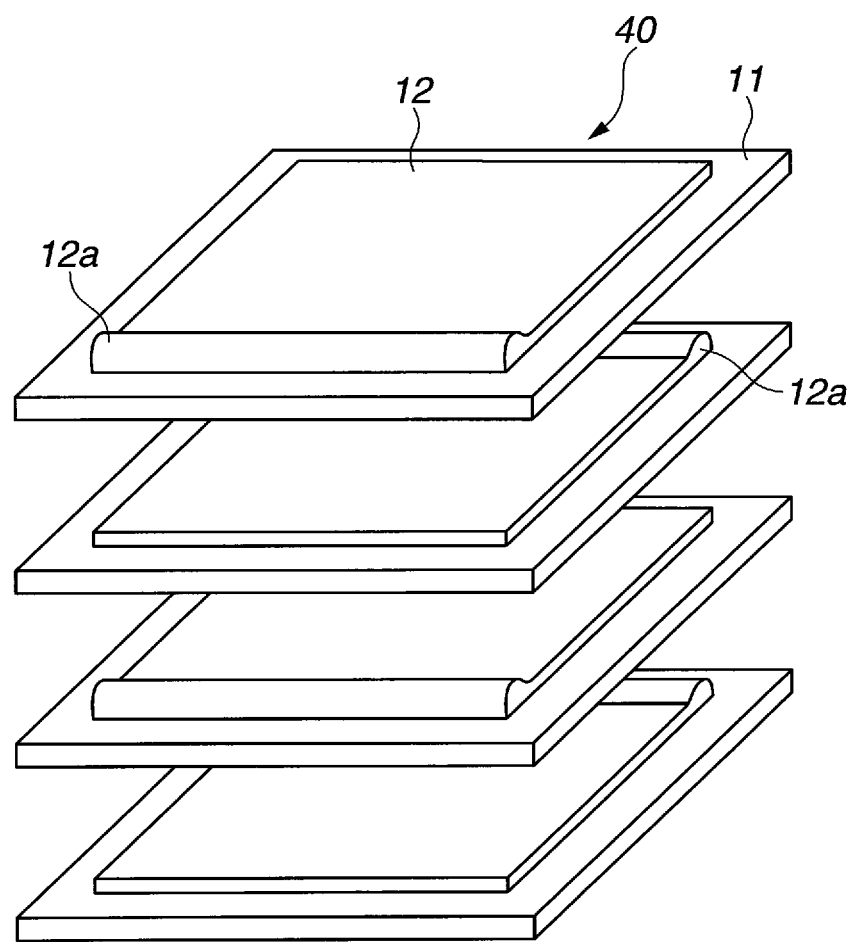
FIG. 13 is a perspective view illustrating a stacking orientation of the bipolar electrodes in the bipolar secondary battery according to the fourth embodiment.

As shown in FIG. 13, when bipolar electrodes 40 are stacked on one another such that positive electrode layer 12 and negative electrode layer 13 are opposed to each other along separator 14 therebetween, bipolar electrodes 40 adjacent to each other in the stacking direction are alternately arranged in a horizontal direction (alternating orientations) such that protrudent portion 12a of one of adjacent bipolar electrodes 40 is located on one peripheral edge of one surface of separator 14 and protrudent portion 13a of the other of adjacent bipolar electrodes 40 is located on the other peripheral edge of an opposite surface of separator 14.

With the above construction of the bipolar secondary battery of the fourth embodiment, protrudent portion 12a of positive electrode layer 12 and protrudent portion 13a of negative electrode layer 13, which are opposed to each other along the length of separator 14, are prevented from being in alignment with each other.

A method for manufacturing the bipolar secondary battery of the fourth embodiment is now explained. First, bipolar electrode 40 is prepared by starting application of the slurries of the electrode active materials at the same application start position to form positive electrode layer 12 and negative electrode layer 13. Thus prepared bipolar electrodes 40 are stacked on each other so as to sandwich separator 14 therebetween while being alternately arranged in the horizontal direction thereof. That is, alternating bipolar electrodes are rotated 180 degrees such that the application start positions alternate in the stacking direction.

Subsequently, similar to the first embodiment, after seal member 51 is fitted to the outer periphery of each of unit cells 15, electrode tabs 53 and 54 are pulled out. Then, the stacked body is sealed with laminate sheet 52.

In the thus produced bipolar secondary battery of the fourth embodiment, protrudent portions 12a and 13a formed at the application start positions on positive electrode layer 12 and negative electrode layer 13 can be prevented from being in alignment with each other when protrudent portions 12a and 13a are opposed to each other with separator 14. With this construction, similar to the first embodiment, protrudent portions 12a and 13a can be prevented from pressing local areas of separator 14 so that occurrence of an internal short circuit in the unit cell 15 can be suppressed.

Further, the materials for the respective parts to be used in the fourth embodiment may be the same as those in the first embodiment as described above. Similar to the first embodiment, the bipolar secondary battery of the fourth embodiment may constitute an assembled battery, and the assembled battery may be installed to vehicles. The assembled battery and vehicles with an assembled battery can attain excellent durability, similar to those in the first embodiment.

Figure 14:
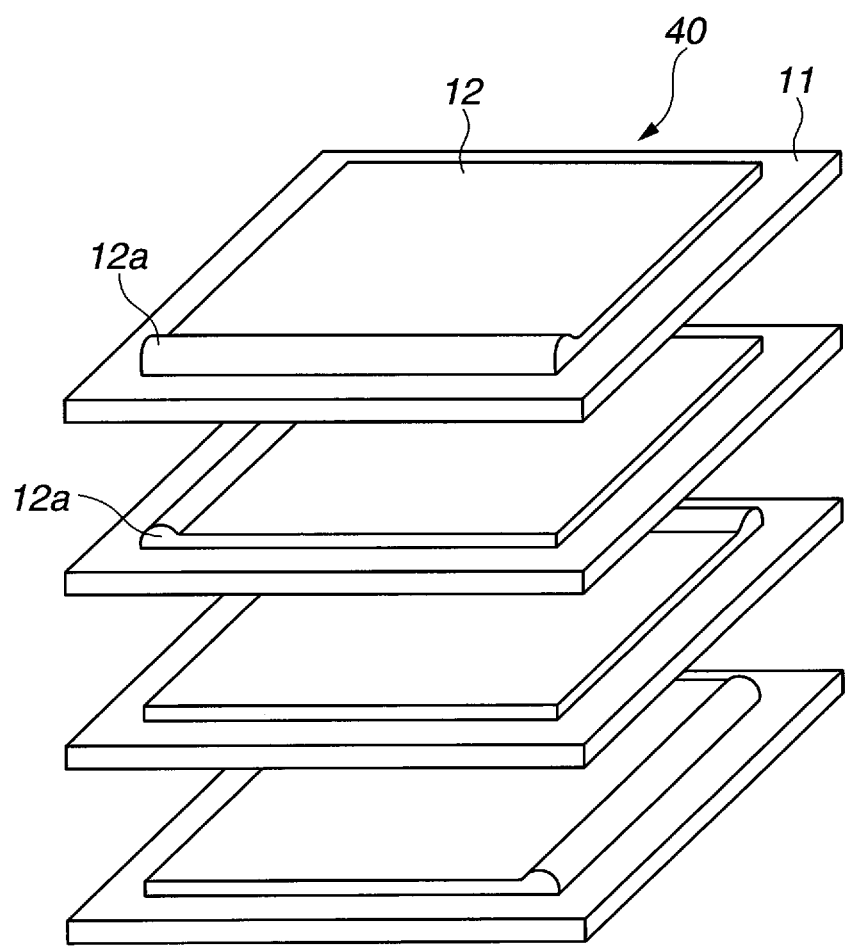
FIG. 14 is a perspective view illustrating a modification of the stacking orientation of the bipolar electrodes in the bipolar secondary battery according to the fourth embodiment.

Although FIG. 13 shows bipolar electrode 40 having a rectangular shape, bipolar electrode 40 may also be formed into a square shape. In a case where bipolar electrode 40 has a square shape, bipolar electrodes 40 may be stacked on one another such that protrudent portions 12a and 13a formed at the application start positions on positive electrode layer 12 and negative electrode layer 13 of one of the adjacent bipolar electrodes 40 are positioned angularly offset by an angle of 90 degrees from protrudent portions 12a and 13a of the other of the adjacent bipolar electrodes 40 as shown in FIG. 14. Even in this case, protrudent portions 12a and 13a can be prevented from being in alignment with each other when protrudent portions 12a and 13a are opposed to each other with separator 14 therebetween. Therefore, it is possible to suppress occurrence of an internal short circuit due to the raised end portions of the electrode layers disposed at the application start positions.

Next described are examples of bipolar secondary batteries according to the above-described embodiments. The batteries were produced in the following manner and were evaluated by subjecting them to a charge/discharge cycle test and a vibration test.

1) Negative Electrode Layer

A negative electrode slurry was prepared by blending the following materials at a predetermined ratio.

Negative electrode active material: $Li_4Ti_5O_{12}$, 85 wt %
Electrically Conducting Assistant: acetylene black, 5 wt %
Binder: PVDF, 10 wt %
Slurry viscosity controlling solvent: NMP The prepared negative electrode slurry was applied to one surface of a SUS foil (thickness: 20 μm) as a current collector and then dried to thereby form a negative electrode layer. As a result of observing the negative electrode layer after being applied and dried, it was recognized that a raised portion of the negative electrode layer was formed at the position where the application of the slurry was started.

2) Positive Electrode Layer

A positive electrode slurry was prepared by blending the following materials at a predetermined ratio.

Positive electrode active material: $LiMn_2O_4$, 85 wt %
Electrically Conducting Assistant: acetylene black, 5 wt %
Binder: PVDF, 10 wt %
Slurry viscosity controlling solvent: NMP The prepared positive electrode slurry was applied to the opposite surface of the SUS foil from the surface formed with the negative electrode layer and then was dried to thereby form a positive electrode layer. As a result of observing the positive electrode layer after being applied and dried, it was recognized that a raised portion of the positive electrode layer was formed at the position where the application of the slurry was started.

Thus, a bipolar electrode was produced, which was formed with the positive electrode layer and the negative electrode layer on both of the surfaces of the SUS foil as the current collector. The bipolar electrode had a square shape.

3) Separator

A gel electrolyte was used as a separator containing an electrolyte.

The gel electrolyte as the separator was prepared as follows. A 50 μm-thick nonwoven fabric formed of polypropylene was impregnated with a pre-gel solution that was formed of a 5 wt % monomer solution of a precursor of an ion-conductive polymer matrix having an average molecular weight of 7500 to 9000 (a copolymer of polyethylene oxide and polypropylene oxide), a 95 wt % electrolytic solution (EC+DMC (1:3)), 1.0 M $LiBF_4$ and a polymerization initiator (BDK). The impregnated nonwoven fabric was sandwiched between quartz glass substrates and irradiated with ultraviolet rays for 15 minutes to crosslink the precursor and thereby obtain a gel polymer electrolytic layer.

4) Stacking Step

The nonwoven fabric carrying the electrolyte was placed on the negative electrode of the bipolar electrode, and then a three-layered hot melt coating was formed around an outer periphery of the nonwoven fabric and used as a seal member. The thus prepared bipolar electrode and the separator together with the seal member were stacked to form a five-layered structure, and the seal member was fused from above and below by heating and pressing to thereby seal the respective layers.

Subsequently, the stacked body was sealed with a laminate pack. Thus, the bipolar secondary battery was produced.

Example 1

Upon preparing each of the bipolar electrodes, the positive electrode slurry was applied to a front surface of the current collector so as to reduce the size of the resultant positive electrode by 2.5 mm in the vertical and lateral directions as compared to the negative electrode applied to a rear surface of the current collector.

Example 2

Upon preparing each of the bipolar electrodes, the application of the positive electrode slurry and the application of the negative electrode slurry were started from positions on the opposite surfaces of the current collector that were aligned with each other. The prepared bipolar electrodes were stacked on one another while alternately rotating them by an angle of 180 degrees.

Example 3

Upon preparing each of the bipolar electrodes, after the positive electrode slurry was applied, the negative electrode slurry was applied such that the application start position thereof was disposed on a side of the application termination position of the previously applied positive electrode slurry.

Comparative Example 1

Upon preparing each of the bipolar electrodes, after the positive electrode slurry was applied, the negative electrode slurry was applied such that the application start position thereof was disposed on a side of the application start position of the previously applied positive electrode slurry. And the application start position of the positive electrode slurry was aligned with the application start position of the negative electrode slurry with the separator therebetween so as to align the start positions with each other when the bipolar electrodes and separators were in a stacked position.

Evaluation was performed using a charge/discharge cycle test. Twenty bipolar secondary batteries were prepared of each Example 1 to 3 and Comparative Example 1 and were subjected to a charge/discharge cycle test. One cycle of the test comprised subjecting the bipolar secondary batteries to constant-current charging (CC) with 0.5 C current until reaching 13.5V, and then to constant-voltage charging until the total charge time reached 5 hours. Subsequently, the bipolar secondary batteries were discharged with 0.5 C current until reaching 7.7V.

The bipolar secondary batteries of Examples 1 to 3, that is, the bipolar secondary batteries in each of which the raised portions formed at the end portions of the electrode layers (application edge portions) are not in alignment with each other along the separator were prevented from undergoing a short circuit therein and maintained a suitable voltage and exhibited good cycle characteristics even when the number of cycles of the charge/discharge cycle test exceeded 50 times.

Six bipolar secondary batteries among the 20 bipolar secondary batteries obtained in Comparative Example 1 suffered from a short circuit at the end portions of the electrode layers (the application edge portions) at an initial time of charging or several times of charging, so that the battery voltage was considerably reduced.

Evaluation was also performed using a vibration test. Five bipolar secondary batteries that did not suffer from the short circuit were selected from the 20 bipolar secondary batteries of respective Examples 1 to 3 and Comparative Example 1 and subjected to constant-current charging (CC) with 0.5 C current until reaching 13.5V, and then to constant-voltage charging until the total charge time reached 5 hours. Subsequently, vibration was applied to the five bipolar secondary batteries for a long period of time, and then the five bipolar secondary batteries were subjected to voltage measurement to thereby measure a voltage retention rate thereof.

The vibration test was carried out under the following test conditions. A simple vibration having a frequency of 50 Hz and an amplitude of 3 mm was applied to the five bipolar secondary batteries of respective Examples 1 to 3 in a vertical direction for 200 hours. Subsequently, the five bipolar secondary batteries of respective Examples 1 to 3 were subjected to battery voltage measurement to thereby measure a voltage retention rate thereof after the vibration test.

The voltages applied to the five bipolar secondary batteries of Example 1 before the vibration test averaged 13.47V, whereas the voltages applied to the five bipolar secondary batteries of Example 1 after the vibration test averaged 13.33V. Accordingly, the average of the voltage retention rates of the five bipolar secondary batteries of Example 1 was 98.96%.

The voltages applied to the five bipolar secondary batteries of Example 2 before the vibration test averaged 13.48V, whereas the voltages of the five bipolar secondary batteries of Example 2 after the vibration test averaged 13.21V. Accordingly, the average of the voltage retention rates of the five bipolar secondary batteries of Example 2 was 98.00%.

The voltages applied to the five bipolar secondary batteries of Example 3 before the vibration test averaged 13.46V, whereas the voltages applied to the five bipolar secondary batteries of Example 2 after the vibration test averaged 13.18V. Accordingly, the average of the voltage retention rates of the five bipolar secondary batteries of Example 3 was 97.92%.

The voltages applied to the five bipolar secondary batteries of Comparative Example 1 before the vibration test averaged 13.46V, whereas the voltages applied to the five bipolar secondary batteries of Comparative Example 1 after the vibration test averaged 12.23V. Accordingly, the average of the voltage retention rates of the five bipolar secondary batteries of Comparative Example 1 was 90.86%.

From the above results of the vibration test, it was recognized that the bipolar secondary batteries of Examples 1 to 3 had a high resistance to vibration and were excellent in durability.

The above results of the tests are shown and enumerated in Table 1.

TABLE 1

| Proportion defective | Comparative Example 1 | Example 1 | Example 2 | Example 3 |
| --- | --- | --- | --- | --- |
| Results of charge/discharge cycle test | 30% (6/20 in number) | 0% (0/20 in number) | 0% (0/20 in number) | 0% (0/20 in number) |
| Results of vibration test | 90.86% | 98.96% | 98.00% | 97.92% |

From the above results of the respective tests in Examples 1 to 3 and Comparative Example 1, it was recognized that embodiments of the bipolar secondary battery of the invention can be enhanced in not only their charge/discharge cycle characteristic but also in their vibration resistance.

The above-described embodiments and examples can exhibit the following effects.

Positive electrode layer 12 and negative electrode layer 13, which are opposed to each other with separator 14 therebetween, have end portions at which application of the electrode active materials is started that are disposed at positions different from each other (that is, out of alignment with each other). With this construction, even if raised portions (i.e., protrudent portions) are formed at the end portions of positive electrode layer 12 and negative electrode layer 13 upon application of the electrode active materials, separator 14 can be prevented from being locally pressed by the raised portions of positive and negative electrode layers 12 and 13 so that occurrence of an internal short circuit in the unit cell can be suppressed to thereby enhance durability of the separator 14 and hence any resulting battery including these elements.

Further, since the application start positions for positive electrode layer 12 and negative electrode layer 13 are offset from each other with respect to single current collector 11, it is not necessary to consider the orientation of bipolar electrode 10 upon manufacturing the battery. Further, the raised portions formed at the end portions of positive electrode layer 12 and negative electrode layer 13 can be surely prevented from being opposed in alignment with each other by setting an amount of offset of the application start positions to not less than about 2 mm.

Further, the application start positions for positive electrode layer 12 and negative electrode layer 13 may be disposed on opposite sides of single current collector 11. With this construction, even if raised portions are formed at the end portions of positive electrode layer 12 and negative electrode layer 13, namely, at the application start positions, separator 14 can be prevented from undergoing pressure from the raised portions. Therefore, it is possible to eliminate occurrence of an internal short circuit in the unit cell and enhance durability of the battery.

Further, the application start positions for positive electrode layer 12 and negative electrode layer 13 with respect to single current collector 11 may be disposed perpendicular to each other. With this construction, even if raised portions are formed at the end portions of positive electrode layer 12 and negative electrode layer 13, namely, at the application start positions, separator 14 can be prevented from undergoing pressure from the raised portions. Therefore, it is possible to eliminate occurrence of an internal short circuit in a unit cell and enhance durability of a battery incorporating the unit cell. In particular, in a case where bipolar electrode 10 is formed into a square shape, it is not necessary to consider the orientation of bipolar electrode 10 upon manufacturing the battery.

Further, upon stacking bipolar electrodes 10, each having positive electrode layer 12 and negative electrode layer 13 in opposite alignment with respect to each other, bipolar electrodes 10 may be alternately disposed in different orientation directions from each other such that portions of positive electrode layer 12 and negative electrode layer 13 disposed at the application start positions are in positions different from each other. With this construction, slurries of the electrode active materials for positive electrode layer 12 and negative electrode layer 13 can be applied in the same manner, thereby facilitating the manufacture of the bipolar secondary battery.

Negative electrode layer 13 and positive electrode layer 12 may be configured such that an area of negative electrode layer 13 is larger than an area of positive electrode layer 12. In this manner, it is possible to suppress formation of lithium dendrite due to repetitive charge and discharge cycles of the bipolar secondary battery.

In bipolar electrode 10 itself, positive electrode layer 12 and negative electrode layer 13 disposed on opposite surfaces of current collector 11 have end portions disposed at positions different from each other. With this construction, current collector 11 can be prevented from suffering from application of pressure from the raised portions (the protrudent portions) disposed at the end portions of positive electrode layer 12 and negative electrode layer 13. Therefore, it is possible to suppress occurrence of an internal short circuit caused by pressure applied to current collector 11 by the raised portions. This results in enhanced durability of bipolar electrode 10.

Although the embodiments and examples of the invention are explained above, the invention is not limited to the above embodiments and examples. For instance, the end portions of the positive electrode layer and the negative electrode layer need not be offset from each other in all of the bipolar electrodes, but the positive electrode layer and the negative electrode layer may be alternately placed at different positions such that the end portions of the positive electrode layer and the negative electrode layer on opposite sides of the separator are disposed out of alignment.

Accordingly, the above-described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A bipolar secondary battery, comprising:
    a plurality of bipolar electrodes, each including a plate-shaped current collector, a first electrode layer formed on a first surface of the current collector and a second electrode layer formed on a second surface of the current collector opposite to the first surface, and the plurality of bipolar electrodes being stacked on one another such that the first electrode layer of one of the bipolar electrodes opposes the second electrode layer of an adjacent one of the bipolar electrodes; and
    a separator disposed between adjacent bipolar electrodes;
    at least one of a first end portion and a second end portion of each first electrode layer having a protrudent portion, wherein the protrudent portion has a thickness in a stacking direction greater than a thickness of the first electrode layer;
    at least one of a first end portion and a second end portion of each second electrode layer having a protrudent portion, wherein the protrudent portion has a thickness in a stacking direction greater than a thickness of the second electrode layer; and
    the protrudent portion of the first electrode layer of the one of the bipolar electrodes and the protrudent portion of the second electrode layer of the adjacent one of the bipolar electrodes are disposed at positions unaligned from each other when the bipolar electrodes are in a stacked position.

2. The bipolar secondary battery as claimed in claim 1, wherein the protrudent portion of the first electrode layer and the protrudent portion of the second electrode layer are disposed proximate to an outer circumferential periphery of the current collector.

3. The bipolar secondary battery as claimed in claim 1, wherein the protrudent portion of the first electrode layer is disposed along a first side of an outer circumferential periphery of the current collector, and the protrudent portion of the second electrode layer is disposed along a second side of the outer circumferential periphery of the current collector.

4. The bipolar secondary battery as claimed in claim 1, wherein the first side and the second side are the same side of an outer circumferential periphery of the current collector.

5. The bipolar secondary battery as claimed in claim 1, wherein the protrudent portion of the first electrode layer and the protrudent portion of the second electrode layer have a line shape and are oriented parallel to at least one side of an outer circumferential periphery of the current collector.

6. The bipolar secondary battery as claimed in claim 1, wherein the protrudent portion of the first electrode layer and the protrudent portion of the second electrode layer are disposed at positions offset from each other by at least 2 mm.

7. The bipolar secondary battery as claimed in claim 1, wherein the protrudent portion of the first electrode layer and the protrudent portion of the second electrode layer are disposed at positions offset from each other by at least one of at least 10 times a thickness of the first electrode layer or the second electrode layer from a respective surface of the current collector, and at least 50 times a height of the protrudent portion of the first electrode layer or the protrudent portion of the second electrode layer from a respective outermost surface of the first electrode layer or the second electrode layer.

8. The bipolar secondary battery as claimed in claim 1, wherein the first side and the second side are opposite sides of an outer circumferential periphery of the current collector.

9. The bipolar secondary battery as claimed in claim 1, wherein the first side and the second side of an outer circumferential periphery are perpendicular to each other.

10. The bipolar secondary battery as claimed in claim 3, wherein the bipolar electrodes have a square shape.

11. The bipolar secondary battery as claimed in claim 1, wherein a first protrudent portion and a second protrudent portion of respective first and second electrode layers of a first bipolar electrode are in alignment with each other; a first protrudent portion and a second protrudent portion of respective first and second electrode layers of a second bipolar electrode are in alignment with each other; and wherein the first and second protrudent portions of the first bipolar electrode are nonaligned with the first and second protrudent portions of the second bipolar electrode when the first and second bipolar electrodes are in the stacked position adjacent to each other.

12. The bipolar secondary battery as claimed in claim 1, wherein the first electrode layer is a positive electrode layer and the second electrode layer is a negative electrode layer, and a surface area of the negative electrode layer is larger than a surface area of the positive electrode layer.

13. A method for manufacturing a bipolar secondary battery, comprising:
preparing a bipolar electrode that includes a plate-shaped current collector having a first surface and a second surface opposite the first surface, a first electrode layer formed on the first surface and having a protrudent portion at an end portion of the first electrode layer, wherein the protrudent portion has a thickness in a stacking direction greater than a thickness of the first electrode layer, and a second electrode layer formed on the second surface of the current collector having a protrudent portion at an end portion of the second electrode layer, wherein the protrudent portion has a thickness in a stacking direction greater than a thickness of the second electrode layer; and
stacking a plurality of the bipolar electrodes on one another with a separator disposed therebetween such that the first electrode layer of one of the bipolar electrodes and the second electrode layer of an adjacent bipolar electrode are opposed to each other with the separator therebetween and the protrudent portion of the first electrode layer of the one of the bipolar electrodes and the protrudent portion of the second electrode layer of the adjacent bipolar electrode are disposed at positions nonaligned from each other.

14. The method for manufacturing a bipolar secondary battery as claimed in claim 13, wherein preparing the bipolar electrode includes:
forming the first electrode layer by applying a first electrode active material to the first surface of the current collector starting from a first electrode first position and ending at a first electrode second position along the first surface of the current collector; and
forming the second electrode layer by applying a second electrode active material to the second surface of the current collector starting from a second electrode second position and ending at a second electrode second position along the second surface of the current collector, wherein at least one of the first electrode first position is offset from the second electrode first position along a length direction of the current collector and the first electrode second position is offset from the second electrode second position.

15. The method for manufacturing a bipolar secondary battery as claimed in claim 13, wherein preparing the bipolar electrode includes:
forming the first electrode layer by applying a first electrode active material to the first surface of the current collector starting from a first position along the first surface of the current collector; and
forming the second electrode layer by applying a second electrode active material to the second surface of the current collector starting from a second position along the second surface, with the first and second position in alignment with each other; and
wherein stacking the plurality of bipolar electrodes includes alternating the orientation of the bipolar electrodes so that the protrudent portions of the first and second electrode layers of one bipolar electrode are nonaligned with the protrudent portions of the first and second electrode layers of an adjacent bipolar electrode.

16. The method for manufacturing a bipolar secondary battery as claimed in claim 13, wherein preparing the bipolar electrode includes:
forming the first electrode layer by applying a first electrode active material to the first surface of the current collector starting from a first electrode first position and ending at a first electrode second position along the first surface of the current collector; and
forming the second electrode layer by applying a second electrode active material to the second surface of the current collector starting from a second electrode first position and ending at a second electrode second position along the second surface; and
wherein the protrudent portion of the first electrode layer is located at at least one of the first electrode first position and the first electrode second position and the protrudent portion of the second electrode layer is located at at least one of the second electrode first position and the second electrode second position.

17. A bipolar electrode comprising:
- a current collector having a first surface and a second surface opposite the first surface;
- a first electrode layer formed on the first surface of the current collector, the first electrode layer having a protrudent portion at an end portion thereof, wherein the protrudent portion has a thickness in a stacking direction greater than a thickness of the first electrode layer; and
- a second electrode layer formed on the second surface of the current collector, the second electrode layer having a protrudent portion at an end portion thereof, wherein the protrudent portion has a thickness in a stacking direction greater than a thickness of the first electrode layer and the protrudent portion of the first electrode layer and the protrudent portion of the second electrode layer are disposed at positions nonaligned from each other.

18. The bipolar electrode as claimed in claim 17, wherein the protrudent portion of the first electrode layer and the protrudent portion of the second electrode layer are disposed on a same side of an outer circumferential periphery of the current collector at positions offset from each other.

19. The bipolar electrode as claimed in claim 18, wherein the protrudent portion of the first electrode layer and the protrudent portion of the second electrode layer are offset from each other by at least 2 mm along the length of the current collector.

20. A method for manufacturing a bipolar electrode, comprising:
- forming a first electrode layer by applying a first electrode active material to a first surface of a current collector starting from a first position, the first electrode layer having a protrudent portion at an end portion thereof, wherein the protrudent portion has a thickness in a stacking direction greater than a thickness of the first electrode layer; and
- forming a second electrode layer by applying a second electrode active material to a second surface of the current collector starting from a second position offset from the first position at which application of the first electrode active material is started, the second electrode layer having a protrudent portion at an end portion thereof, wherein the protrudent portion has a thickness in a stacking direction greater than a thickness of the first electrode layer and the protrudent portion of the first electrode layer and the protrudent portion of the second electrode layer are disposed at positions nonaligned from each other.

21. A battery assembly comprising:
- a plurality of the bipolar secondary batteries according to claim 1 connected to each other in at least one of series and parallel.

* * * * *